(12) United States Patent
Brink et al.

(10) Patent No.: US 10,833,879 B2
(45) Date of Patent: *Nov. 10, 2020

(54) QUBIT NETWORK SECURE IDENTIFICATION

(71) Applicant: INTERNATIONAL BUSINESS MACHINES CORPORATION, Armonk, NY (US)

(72) Inventors: Markus Brink, White Plains, NY (US); Jared B. Hertzberg, Ossining, NY (US); Sami Rosenblatt, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,310

(22) Filed: Nov. 15, 2017

(65) Prior Publication Data

US 2018/0337792 A1 Nov. 22, 2018

Related U.S. Application Data

(63) Continuation of application No. 15/598,883, filed on May 18, 2017.

(51) Int. Cl.
*H04L 9/32* (2006.01)
*G06N 10/00* (2019.01)
(Continued)

(52) U.S. Cl.
CPC ............ *H04L 9/3278* (2013.01); *G06F 21/44* (2013.01); *G06N 10/00* (2019.01); *H01L 39/223* (2013.01);
(Continued)

(58) Field of Classification Search
CPC ..... G06N 10/00; H01L 39/223; H01L 39/025; H04L 9/3278
See application file for complete search history.

(56) References Cited

U.S. PATENT DOCUMENTS 4,344,052 A 8/1982 Davidson
6,836,141 B2 12/2004 Herr
(Continued)

FOREIGN PATENT DOCUMENTS

CN 106098926 A 11/2016
EP 1884791 A1 2/2008
(Continued)

OTHER PUBLICATIONS

Markus Brink et al., "Qubit Network Secure Identification", Related Application, U.S. Appl. No. 15/598,883, filed May 18, 2017.
(Continued)

*Primary Examiner* — Jeremy S Duffield
(74) *Attorney, Agent, or Firm* — Cantor Colburn LLP; Douglas Pearson

(57) ABSTRACT

A technique relates to a superconducting chip. Resonant units each include a Josephson junction. The resonant units have resonant frequencies whose differences are based on a variation in the Josephson junction. A transmission medium is coupled to the resonant units, and the transmission medium is configured to output a sequence of the resonant frequencies as an identification of the chip.

16 Claims, 16 Drawing Sheets

(51) Int. Cl.
  *G06F 21/44* (2013.01)
  *H01L 39/22* (2006.01)
  *H01L 39/24* (2006.01)
  *H01L 27/18* (2006.01)
  *B82Y 10/00* (2011.01)
(52) U.S. Cl.
  CPC .............. *B82Y 10/00* (2013.01); *H01L 27/18* (2013.01); *H01L 39/2493* (2013.01); *Y10S 977/933* (2013.01)

(56) References Cited

U.S. PATENT DOCUMENTS

| | | | |
|---|---|---|---|
| 7,479,652 B2 | 1/2009 | Greentree et al. | |
| 7,889,992 B1 | 2/2011 | Divincenzo et al. | |
| 8,018,244 B2 | 9/2011 | Berkley | |
| 8,138,784 B2 | 3/2012 | Przybysz et al. | |
| 8,437,818 B1* | 5/2013 | Tolpygo | H01L 27/18 505/190 |
| 9,013,916 B2 | 4/2015 | Naaman et al. | |
| 9,208,861 B2 | 12/2015 | Herr et al. | |
| 9,281,057 B1 | 3/2016 | Herr et al. | |
| 10,396,268 B2 | 8/2019 | Brink et al. | |
| 2003/0186467 A1* | 10/2003 | Adachi | H01L 39/2496 438/2 |
| 2004/0155237 A1 | 8/2004 | Kerber | |
| 2009/0289638 A1* | 11/2009 | Farinelli | G06N 10/00 324/652 |
| 2010/0176920 A1 | 7/2010 | Kursawe et al. | |
| 2011/0012619 A1 | 1/2011 | Ketchen et al. | |
| 2011/0057169 A1* | 3/2011 | Harris | B82Y 10/00 257/31 |
| 2013/0015885 A1 | 1/2013 | Naaman et al. | |
| 2014/0167811 A1 | 6/2014 | Gambetta et al. | |
| 2014/0235450 A1* | 8/2014 | Chow | H01L 39/00 505/170 |
| 2015/0101037 A1* | 4/2015 | Yang | G06F 21/44 726/16 |
| 2015/0262662 A1 | 9/2015 | Andre | |
| 2016/0065693 A1 | 3/2016 | Rose et al. | |
| 2016/0191060 A1 | 6/2016 | McDermott, III | |
| 2016/0308502 A1* | 10/2016 | Abdo | H03F 7/04 |
| 2016/0335558 A1 | 11/2016 | Bunyk et al. | |
| 2017/0076787 A1 | 3/2017 | Frank | |
| 2017/0132610 A1 | 5/2017 | Deliwala et al. | |
| 2018/0232654 A1* | 8/2018 | Epstein | H03K 19/195 |
| 2018/0337322 A1 | 11/2018 | Brink et al. | |
| 2018/0337790 A1 | 11/2018 | Brink et al. | |
| 2018/0337792 A1 | 11/2018 | Brink et al. | |
| 2019/0006284 A1 | 1/2019 | Brink et al. | |
| 2019/0051810 A1 | 2/2019 | Brink et al. | |
| 2019/0204753 A1* | 7/2019 | Burkett | G03F 7/70425 |

FOREIGN PATENT DOCUMENTS

| | | |
|---|---|---|
| WO | 2015035053 A1 | 3/2015 |
| WO | 2016018503 A1 | 2/2016 |
| WO | 2016085629 A1 | 6/2016 |

OTHER PUBLICATIONS

List of IBM Patents or Patent Applications Treated As Related; (Appendix P), Filed Nov. 15, 2017.
Markus Brink et al., "Qubit Network Non-Volatile Identification," U.S. Appl. No. 16/153,866, filed Oct. 8, 2018.
List of IBM Patents or Patent Applications Treated as Related; (Appendix P), Filed Feb. 1, 2019, 2 pages.
List of IBM Patents or Patent Applications Treated as Related; (Appendix P); Date Filed: Oct. 16, 2019, 2 pages.
Markus Brink et al., "Qubit Network Non-Volatile Identification," U.S. Appl. No. 16/654,069, filed Oct. 16, 2019.
Holcomb, D. et al., "Power-up SRAM state as an identifying fingerprint and source of true random numbers," 8 IEEE Trans. Comput., vol. 58, No. 9, pp. 1198)1210, Sep. 2009. Non-Volatile Memory.
Mazin, Benjamin A., "Microwave kinetic inductance detectors." Diss. California Institute of Technology, 2004.
Paik, Hanhee, et al. "Observation of high coherence in Josephson junction qubits measured in a three-dimensional circuit QED architecture." Physical Review Letters 107.24 (2011):240501.
Rosenblatt, S., "Field tolerant dynamic intrinsic chip ID using 32 nm high-k/metal gate SOI embedded DRAM," 8 IEEE J. Solid-State Circuits, vol. 48, No. 4, pp. 940)947, Apr. 2013.
Uhlmann, Gregory et al. "A commercial field-programmable dense eFUSE array memory with 99.999% sense yield for 45 nm SOI CMOS," in IEEE International Solid State Circuits Conference-Digest of Technical Papers, 2008, pp. 406-407.
International Search Report and Written Opinion for Application No. PCT/IB2017/057441 dated Feb. 24, 2018, 9 pages.
International Search Report and Written Opinion for Application No. PCT/IB2017/057677 dated Feb. 12, 2018, 9 pages.
Meckbach et al., "Sub-μm Josephson Junctions for Superconducting Quantum Devices", IEEE, 2013, pp. 1-4.
Zhou et al., "Identification of Markovian open system dynamics for qubit systems", Chinese Science Bulletin 57.18, 2012, pp. 2242-2246.

* cited by examiner

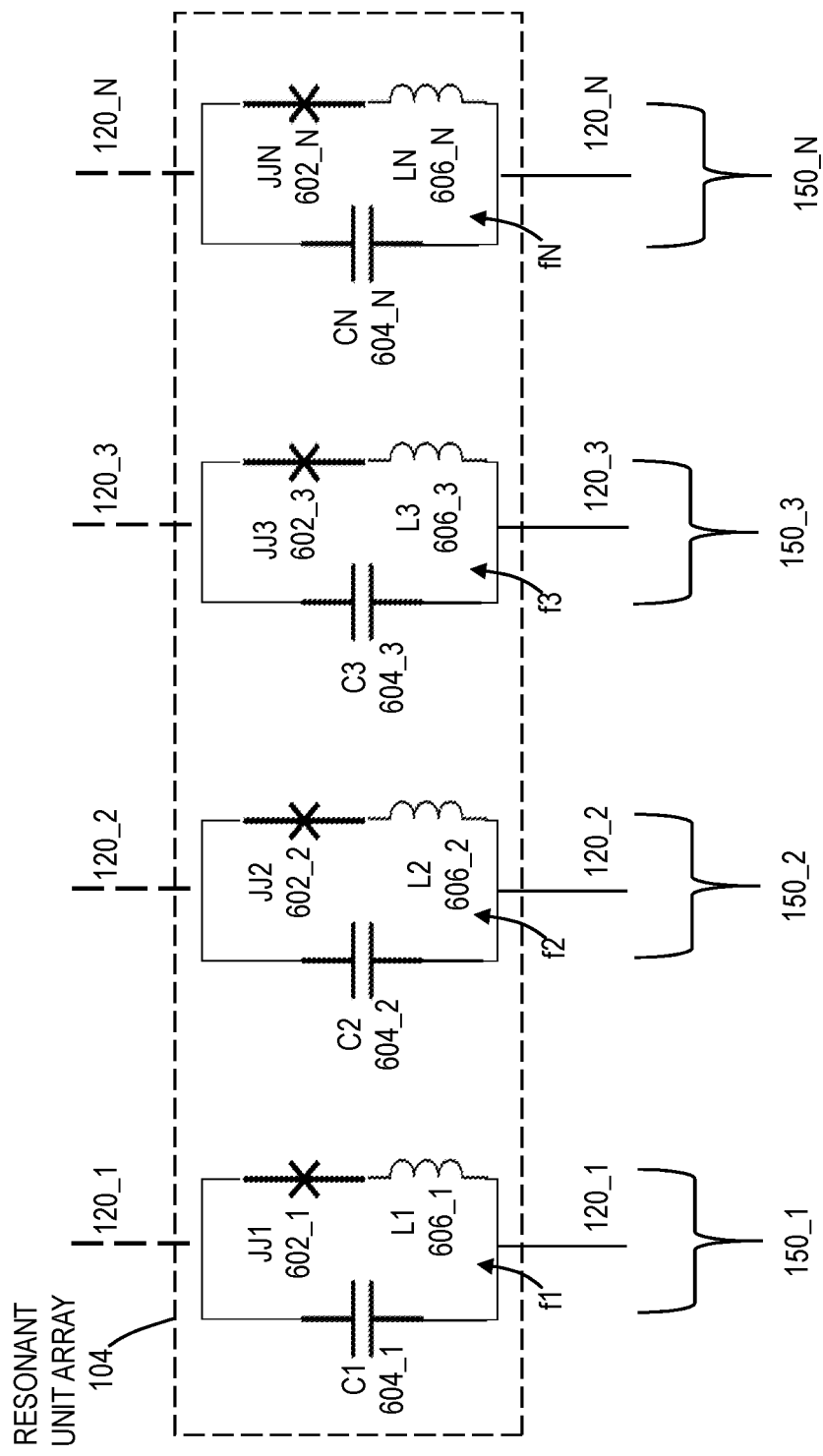

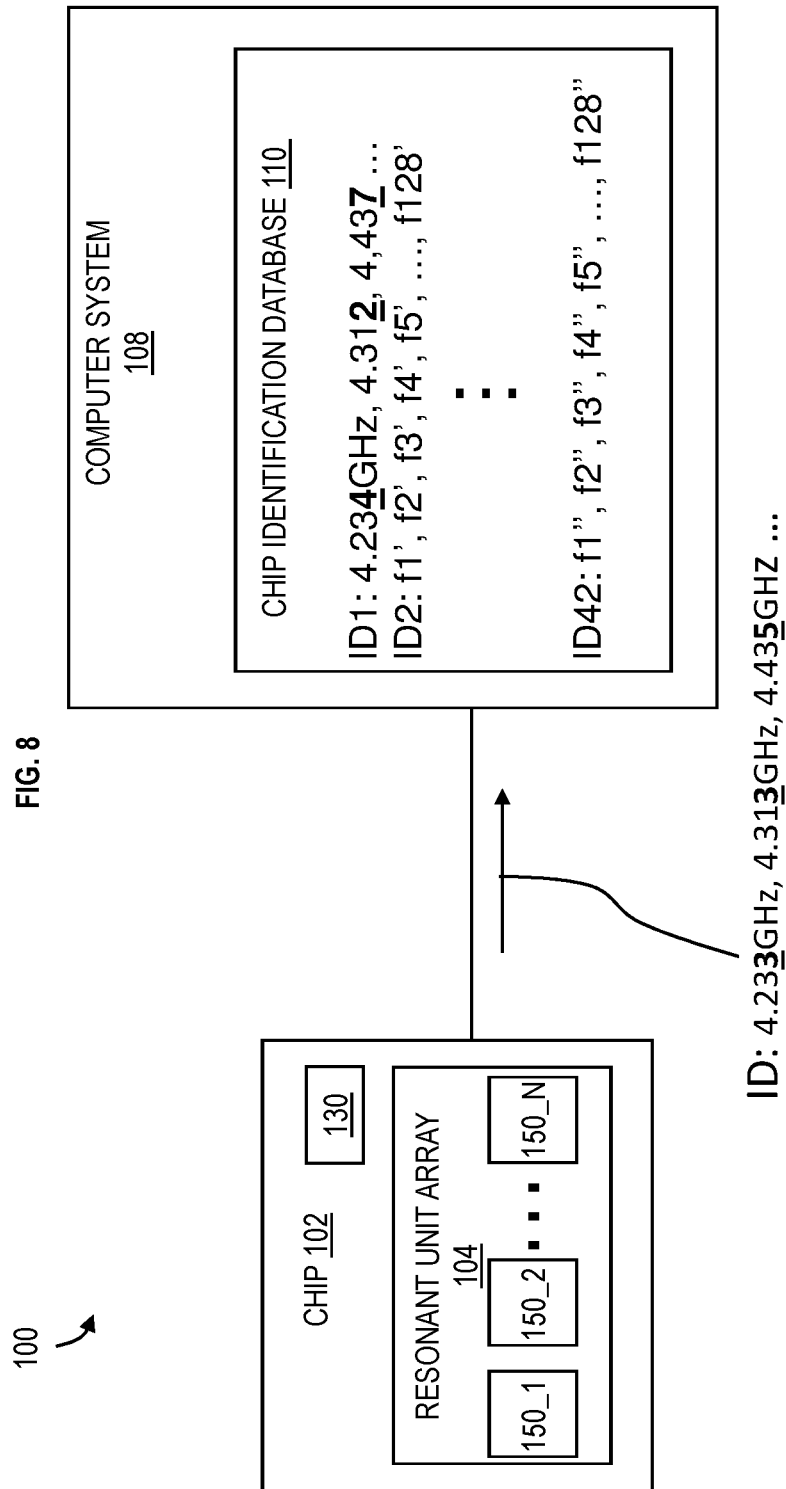

FORMING RESONANT UNITS EACH INCLUDING A JOSEPHSON JUNCTION, THE RESONANT UNITS HAVING RESONANT FREQUENCIES WHOSE DIFFERENCES ARE BASED ON A VARIATION IN THE JOSEPHSON JUNCTION 902

PROVIDE A TRANSMISSION MEDIUM COUPLED TO THE RESONANT UNITS, THE TRANSMISSION MEDIUM BEING CONFIGURED TO OUTPUT A SEQUENCE OF THE RESONANT FREQUENCIES AS AN IDENTIFICATION OF A CHIP 904

RECEIVE A SEQUENCE OF RESONANT FREQUENCIES AS AN IDENTIFICATION OF THE CHIP, WHERE THE RESONANT FREQUENCY DIFFERENCES ARE BASED ON A VARIATION IN JOSEPHSON JUNCTIONS ON THE CHIP 1002

IDENTIFY THE SEQUENCE OF THE RESONANT FREQUENCIES OUTPUT FROM THE CHIP AS A MATCH WITHIN A PREDEFINED MARGIN TO A STORED IDENTIFICATION OF THE CHIP 1004

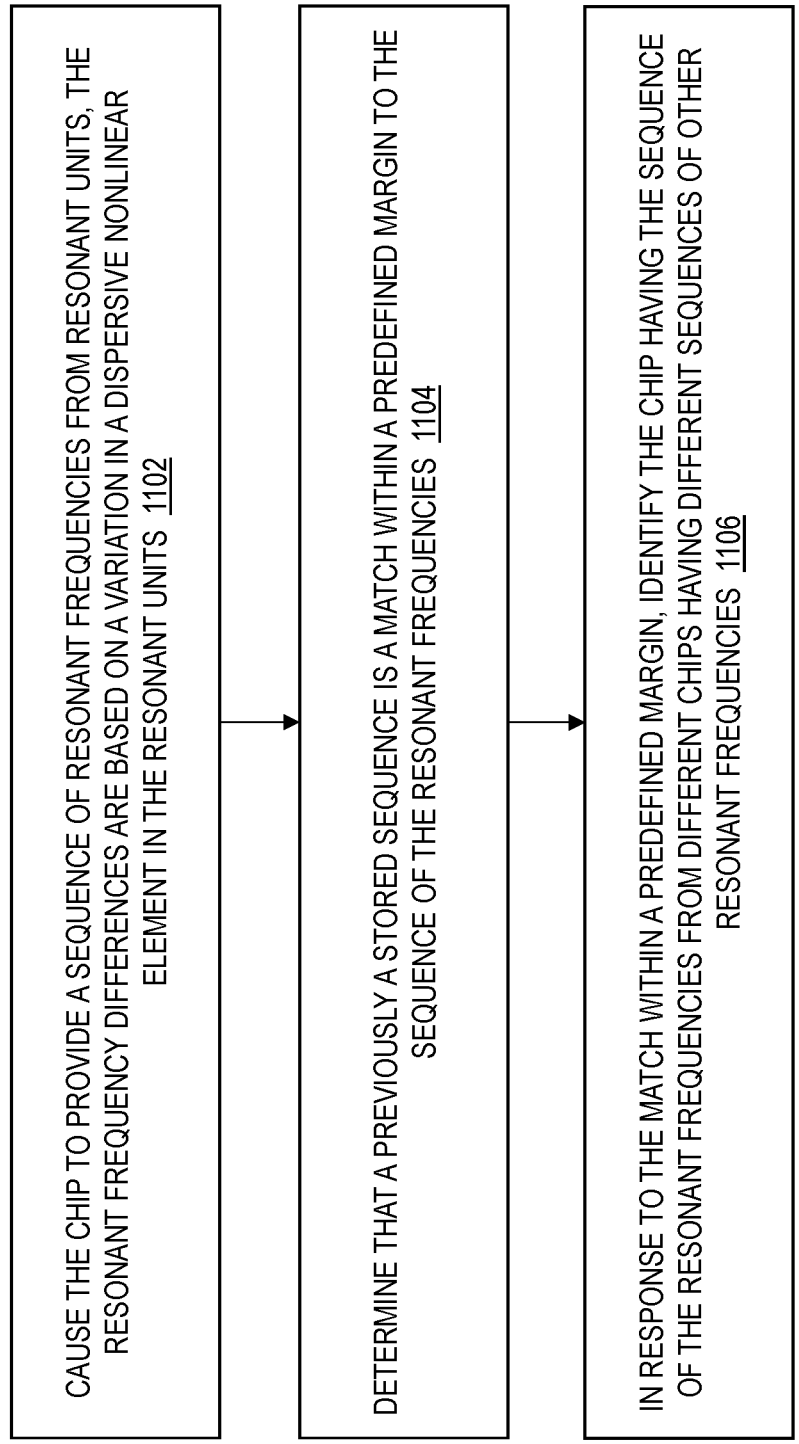

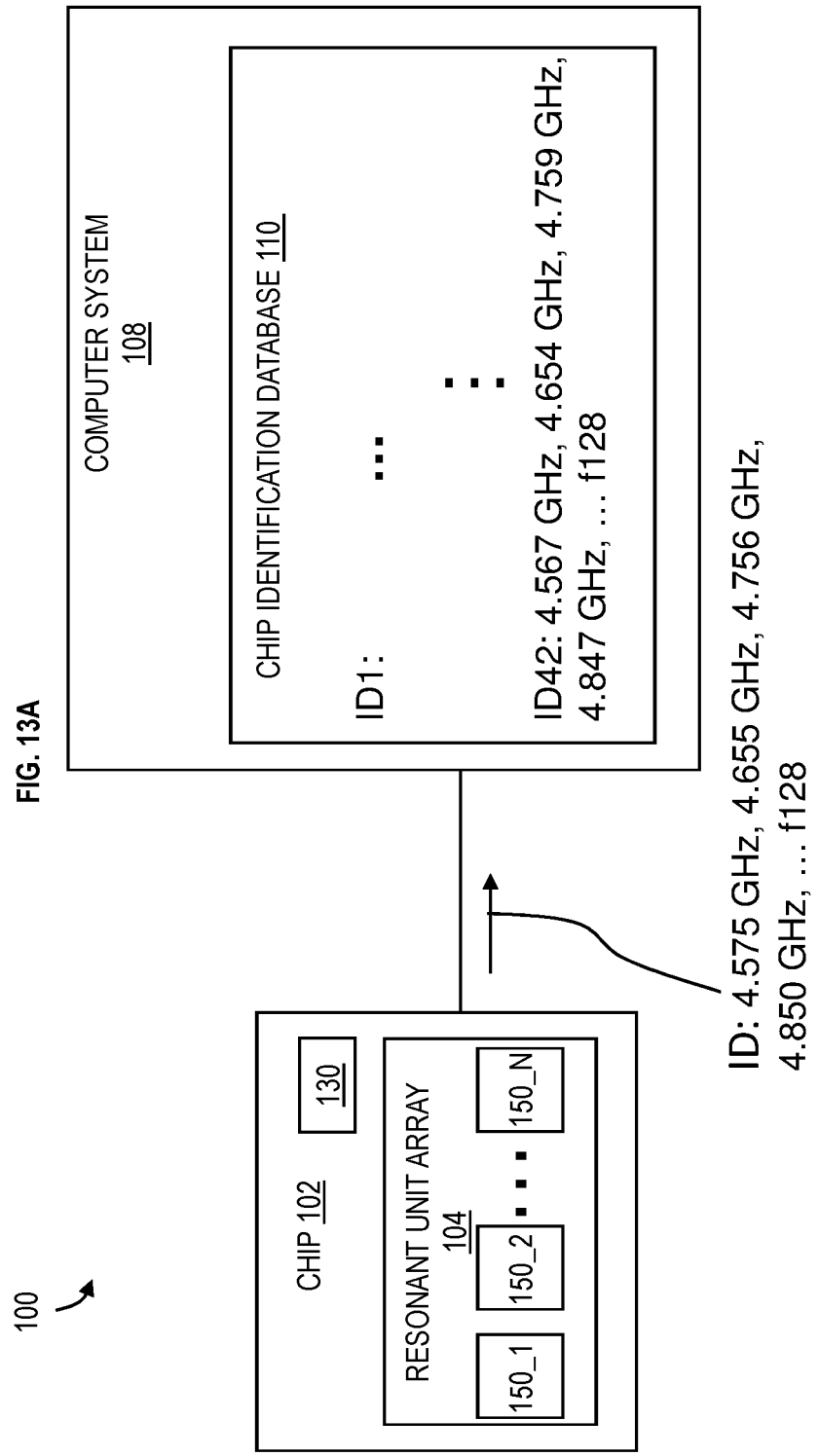

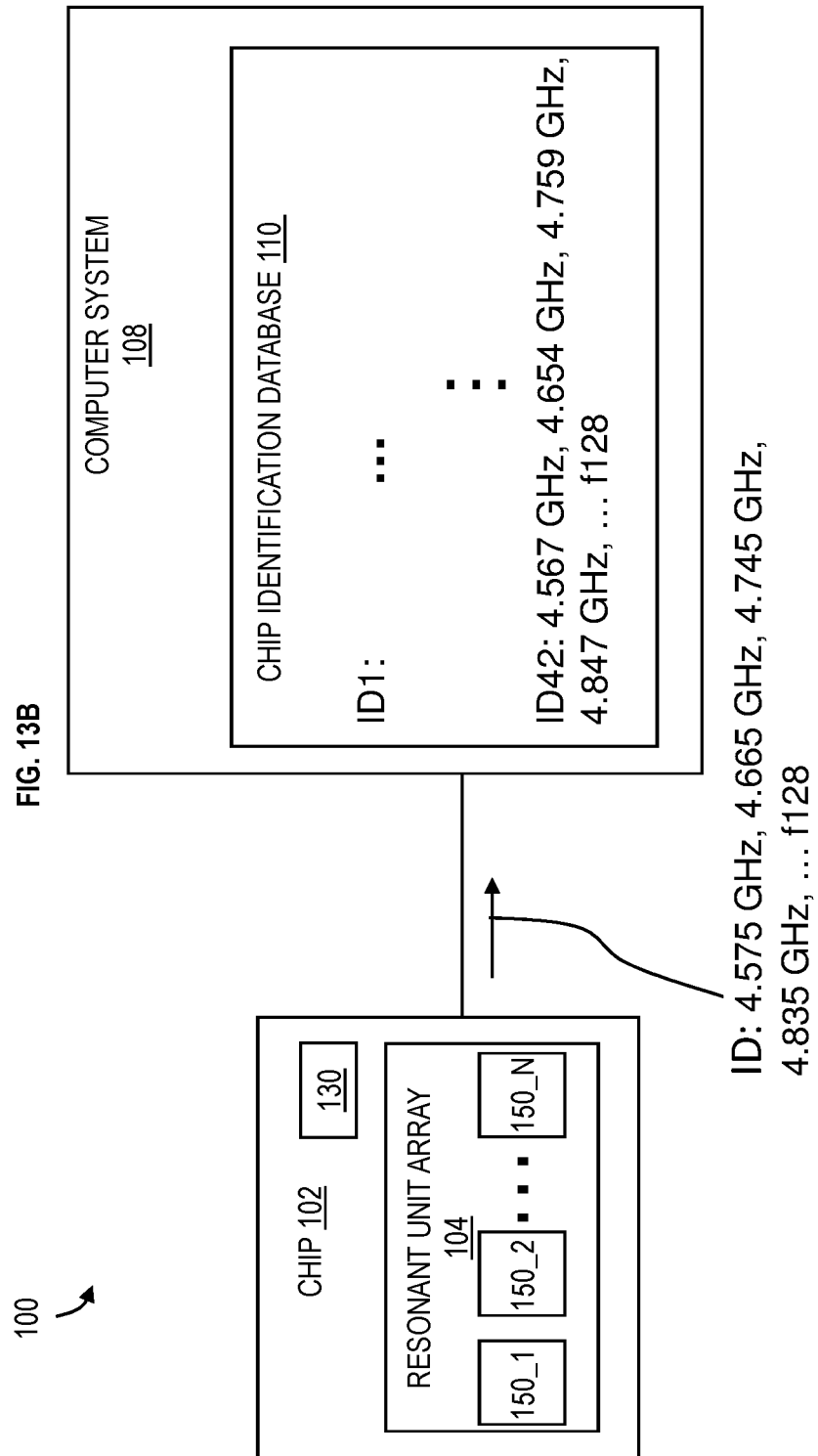

QUBIT NETWORK SECURE IDENTIFICATION

DOMESTIC PRIORITY

This application is a continuation of U.S. application Ser. No. 15/598,883, titled "QUBIT NETWORK SECURE IDENTIFICATION" filed May 18, 2017, the contents of which are incorporated by reference herein in its entirety

BACKGROUND

The present invention generally relates to superconducting devices. More specifically, the present invention relates to qubit network secure identification.

In cryptography, a physically unclonable function (PUF) is a physical entity that is embodied in a physical structure and is easy to evaluate but hard to predict. Further, an individual PUF device must be easy to make but practically impossible to duplicate, even with access to the exact manufacturing process that produced it. In this respect, it is the hardware analog of a one-way function. Despite the name "physically unclonable function," some PUFs are clonable, and most PUFs are noisy and therefore do not achieve the requirements for a function. In the state-of-the-art, PUFs are usually implemented in integrated circuits and are typically used in applications with high security requirements. PUFs depend on the uniqueness of their physical microstructure. This microstructure depends on random physical factors introduced during manufacturing. These factors are unpredictable and uncontrollable which makes it virtually impossible to duplicate or clone the structure.

Rather than embodying a single cryptographic key, PUFs implement challenge—response authentication to evaluate this microstructure. When a physical stimulus is applied to the structure, it reacts in an unpredictable (but repeatable) way due to the complex interaction of the stimulus with the physical microstructure of the device. This exact microstructure depends on physical factors introduced during manufacture which are unpredictable. The applied stimulus is called the challenge, and the reaction of the PUF is called the response. A specific challenge and its corresponding response form a challenge—response pair (CRP). The device's identity is established by the properties of the microstructure itself.

Unclonability means that each PUF device has a unique and unpredictable way of mapping challenges to responses, even if it was manufactured with the same process as a similar device. It is infeasible to construct a PUF with the same challenge—response behavior as another given PUF because exact control over the manufacturing process is not possible. Mathematical unclonability means that it should be very hard to compute an unknown response given the other CRPs or some of the properties of the random components from a PUF. This is because a response is created by a complex interaction of the challenge with many or all of the random components. New ways of creating PUF devices are needed.

SUMMARY

Embodiments of the present invention are directed to a superconducting chip. A non-limiting example of the superconducting chip includes resonant units each including a Josephson junction. The resonant units have resonant frequencies whose differences are based on a variation in the Josephson junction. The superconducting chip includes a transmission medium coupled to the resonant units, and the transmission medium is configured to output a sequence of the resonant frequencies as an identification of the chip.

Embodiments of the present invention are directed to a method of forming a superconducting chip. A non-limiting example of the method of forming the superconducting chip includes forming resonant units each including a Josephson junction, where the resonant units have resonant frequencies whose differences are based on a variation in the Josephson junction. The method includes providing a transmission medium coupled to the resonant units, where the transmission medium is configured to output a sequence of the resonant frequencies as an identification of the superconducting chip.

Embodiments of the invention are directed to a method of identifying a superconducting chip. A non-limiting example of the method of identifying the superconducting chip includes receiving a sequence of resonant frequencies as an identification of the superconducting chip, where a difference in the resonant frequencies is based on a variation in Josephson junctions on the superconducting chip. The method includes identifying the sequence of the resonant frequencies output from the superconducting chip as a match within a predefined margin to a stored identification of the superconducting chip.

Embodiments of the present invention are directed to a method of causing identification of a superconducting chip. A non-limiting example of the method of causing identification of the superconducting chip includes causing the superconducting chip to provide a sequence of resonant frequencies from resonant units, where a difference in the resonant frequencies is based on a variation in a dispersive nonlinear element in the resonant units. The method includes determining that a previously stored sequence is a match within a predefined margin to the sequence of the resonant frequencies, and in response to the match within the predefined margin, identifying the superconducting chip having the sequence of the resonant frequencies from different superconducting chips having different sequences of other resonant frequencies.

Embodiments of the invention are directed to a system. A non-limiting example of the system includes a superconducting chip having resonant units each including a dispersive nonlinear element, where the resonant units have resonant frequencies whose differences are based on a variation in the dispersive nonlinear element, such that a sequence of the resonant frequencies is an identification of the superconducting chip. The system includes a transmission medium coupled to the resonant units, where the transmission medium is configured to output the sequence of the resonant frequencies as the identification of the superconducting chip.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts an example resonant unit array according to embodiments of the present invention;

FIG. 8 depicts example authentication of a superconducting chip according to embodiments of the present invention;

FIG. 9 depicts a flow chart of a method of forming a superconducting chip according to embodiments of the present invention;

FIG. 10 depicts a flow chart of a method of identifying a superconducting chip according to embodiments of the present invention;

FIG. 11 depicts a flow chart of a method of identifying a superconducting chip according to embodiments of the present invention;

FIG. 13A depicts an example of authentication of a superconducting chip according to embodiments of the present invention; and FIG. 13B depicts an example of authentication of a superconducting chip according to embodiments of the present invention.

Figure 1:
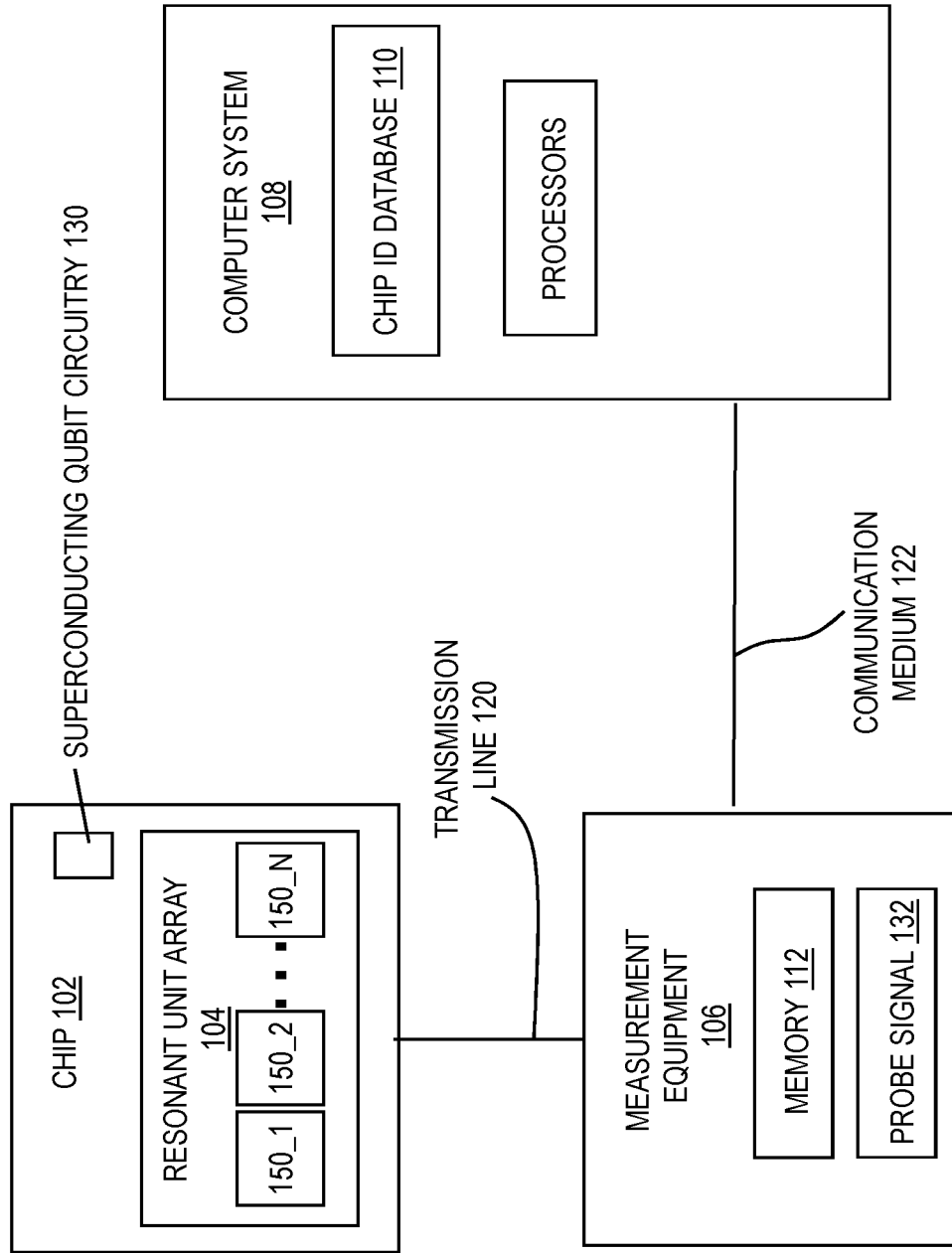
FIG. 1 depicts a schematic of an identification system that provides secure identification of superconducting chips according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, numerous chips are utilized in server farms. A server farm or server cluster is a collection of computer servers, usually maintained by an organization to supply server functionality far beyond the capability of a single machine. Server farms often consist of thousands of computers. As superconducting quantum computing hardware production scales up, a need emerges for means to identify chips in a superconducting quantum computing network (e.g., numerous quantum computers like a server farm in which each quantum computer has at least one superconducting chip) while in operation. For a small number of packaged chips, an inventory can be made to track computing resources. For a network, it is useful and desirable to be able to identify the chip itself. Ideally, this needs to be done in the same environment as the functional hardware and using the same type of measurement tools. In complementary metal-oxide-semiconductor (CMOS), this is usually accomplished by the addition of non-volatile random access memory (NVRAM), such as eFUSE. In eFUSE, bits are programmed during a registration phase prior to deployment in a field and can require some error correction such as a single error-correct, double error-detect (SECDED) Hamming code utilizing spare bits. NVRAM is usually made from one-time programmable read-only memory (OTPROM), and NVRAM does not lose information after power is turned off (as opposed to static random access memory (SRAM) or dynamic random access memory (DRAM)). This approach is usually not secure against counterfeits because the code can be read out either directly or via de-layering of the chip, and multiple copies can be made utilizing either the same type of device or another type of device which maintains the area on the chip.

Turning now to an overview of the aspects of the invention, one or more embodiments of the invention address the above-described shortcomings of the prior art by providing qubit network secure identification. More specifically, the above-described aspects of the invention address the shortcomings of the prior art by providing a secure authentication system that can be readily integrated with superconducting qubit chips (during fabrication), can be read out with the same equipment and techniques for typical superconducting qubit chips, and is secure against counterfeiting. Superconducting tunnel junctions (also referred to as Josephson junctions) used in superconducting quantum chips exhibit a Josephson inductance, making them functionally equivalent to a conventional inductor within the superconducting circuit, when operated at currents lower than their critical current. Variations (or imperfections) in the Josephson junctions during fabrication are utilized to provide random identification of a superconducting qubit chip according to embodiments. Variations (or imperfections) occur unpredictably, randomly and uncontrollably during the fabrication of the Josephson junctions, thereby providing a unique random identification of the superconducting quantum chip. The quantum analog for superconducting quantum chips provides an identification that can be read out using microwave circuitry just as a typical superconducting qubit. The identification is secure because it makes the cost of counterfeiting prohibitive.

Figure 2:
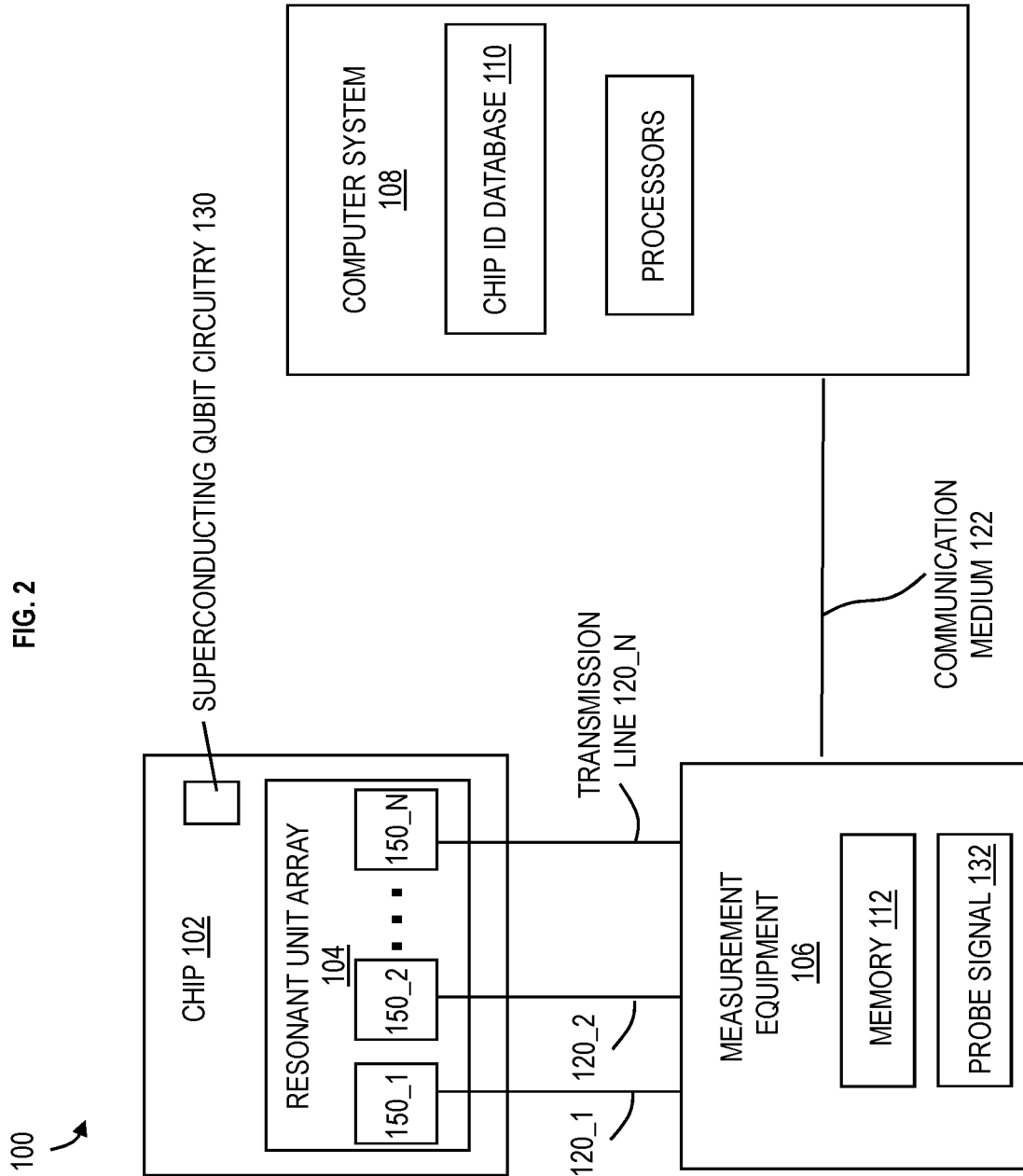
FIG. 2 depicts a schematic of the identification system that provides secure identification of superconducting chips according to embodiments of the present invention.

Turning now to a more detailed description of aspects of the present invention, FIG. 1 depicts a schematic of an identification system 100 configured to provide secure identification of superconducting chips where readout is collectively performed according to embodiments of the present invention. FIG. 2 depicts a schematic of the identification system 100 configured to provide secure identification of superconducting chips where readout is individually addressable according to embodiments of the present invention.

The secure identification system 100 includes a superconducting chip 102. The superconducting chip 102 includes a resonant unit array 104 along with other types of circuitry utilized for quantum computing. For example, other circuitry can include superconducting qubit circuitry 130 utilized for superconducting quantum computing as understood by one skilled in the art. There are various ways to perform quantum computing via superconducting qubit circuitry 130, and typical superconducting qubit circuitry 130 will include the superconducting qubits, readout resonators, coupling resonators, coupling capacitors, coupling inductors and other superconducting circuit elements used for quantum computation. The combination of all these necessary elements is understood by one skilled in the art, and the details are not discussed herein. The superconducting chip 102 operates at superconducting temperatures. The superconducting chip 102 can be cooled by a cryogenic device (not shown) such as a dilution refrigerator.

The resonant unit array 104 includes resonant units 150_1 through 150_N. Each resonant unit 150_1 through 150_N contains a Josephson junction, along with a capacitor, and/or a inductor. A Josephson junction is an example of a dispersive nonlinear element. Various configurations of an individual resonant unit 150 are illustrated in FIGS. 5A, 5B, 5C, 5D, 5E, 5F, 5G, and 5H. Each resonant unit 150_1 through 150_N is a resonator with a unique resonant (or resonance) frequency that can be read out using similar equipment and techniques as those used for resonant frequencies in a typical circuit containing superconducting qubit circuitry 130. For example, the resonant units 150_1 through 150_N have individual resonant frequencies f1 through fN. Typical superconducting qubit circuitry 130 is made and utilized for quantum computations and/or quantum operations (such as entanglement, etc.).

The resonant frequency of each resonant unit 150_1 through 150_N can be read out using measurement equipment 106, which is the same equipment used to read out typical superconducting qubit circuitry 130. The measurement equipment 106 is operatively connected to resonant units 150_1 through 150_N of the resonant unit array 104 on chip 102 via transmission line 120. Unlike FIG. 1, FIG. 2 depicts an example in which each of the resonant units 150_1 through 150_N is individually addressable via transmission lines 120_1 through 120_N. The transmission lines 120_1 through 120_N are feedlines for transmitting and receiving signals (e.g., microwave signal). The transmission lines 120 can be coaxial lines or waveguides. The transmission lines are one type of transmission medium. Another example transmission medium can be a three-dimensional microwave cavity, which can be utilized for readout of the resonant unit array 104. The transmission medium and resonant units 150_1 through 150_N share the same chip 102 with typical superconducting qubit circuitry 130 and other superconducting circuit elements used for quantum computation. Therefore, any implementation must prevent the leakage of quantum information from the superconducting qubit circuitry 130 into the resonant unit array 104. In one implementation, the resonant unit array 104 is strictly separated from the superconducting qubit circuitry 130 by distance on the chip 102 and by grounded shielding incorporated into the chip 102, so as to prevent any capacitive or inductive coupling between the two types of circuitry 104 and 130. In this case, the resonant units 150_1 through 150_N can have resonant frequencies f1 through fN of any value. In another implementation, capacitive or inductive coupling can exist between the two types of circuitry 104 and 130. In this case, the resonant units 150_1 through 150_N must be made so that their resonant frequencies f1 through fN do not overlap the frequencies of the superconducting qubit circuitry 130 utilized for quantum computing. Another implementation in which resonant frequencies f1 through fN can overlap the frequencies of the superconducting qubit circuitry 130 is to add a switch that connects to each of the resonant units 150_1 through 150_N to ground when closed. The switch is closed during the superconducting operation of the superconducting qubit circuitry 130. When open, the resonant units 150_1 through 150_N are not connected to ground and the superconducting qubit circuitry 130 is not performing quantum computing.

The measurement equipment 106 can include a probe signal 132. The probe signal 132 can be produced by a signal generator (e.g., integrated in the measurement equipment 106) configured to generate radio frequency signals (which can be pulses) at desired radio frequencies such as, for example, microwave signals. In order to read the identification of the resonant units 150_1 through 150_N, the probe signal 132 is configured to include microwave signals of the desired/predefined frequencies and transmit to the resonant units 150_1 through 150_N of the resonant unit array 104. FIG. 1 depicts that the probe signal 132 transmits the radio frequency signal (being a sweep of the desired radio frequencies) to the resonant units 150_1 through 150_N collectively (via transmission line 120). In other words, the measurement equipment 106 is configured to transmit the radio frequency signal (covering all of the predefined frequencies) to each of the resonant units 150_1 through 150_N at once using the same transmission medium (e.g., transmission line 120 or a microwave cavity). FIG. 2 depicts that the probe signal 132 (constituting a sweep through the desired frequencies) is transmitted to the resonant units 150_1 through 150_N individually (via transmission lines 120_1 through 120_N). In FIG. 2, the resonant units 150_1 through 150_N can be isolated and each accessed via an individual transmission line, such that the radio frequency signal is switched between these transmission lines 120_1 through 120_N. In one implementation, the radio frequency signal (including all of the desired frequencies) can be simultaneously or nearly simultaneously transmitted on each individual transmission line 120_1 through 120_N to the respective resonant units 150_1 through 150_N. Because the measurement equipment 106 via the probe signal 132 is configured to generate radio frequency signals with predefined frequencies to individually address the resonant units 150_1 through 150_N via individual transmission lines 120_1 through 120_N (as depicted in FIG. 2) and because resonant units 150_1 through 150_N have individual transmission lines 120_1 through 120_N, the resonant frequency can be the same for each resonant units 150_1 through 150_N as long as the resonant units 150_1 through 150_N are individually read out.

In both cases (FIG. 1 and FIG. 2), the radio frequency signal is directed at resonant units 150_1 through 150_N individually and/or directed at the entire array of resonant units 150_1 through 150_N (collectively). In advance, the measurement equipment 106 (which can be operated by an operator) knows the expected/predefined resonant frequencies for resonant units 150_1 through 150_N such that the frequency range (or frequency band) of the radio frequency sign (transmitted to the resonant unit array 104) is intended to match/coincide with the expected resonant frequencies for resonant units 150_1 through 150_N. Because the Josephson junctions from the one resonant unit 150 to the next resonant unit 150 incorporate an uncontrollable variation at the time of their fabrication, the exact value of the resonant frequencies f1 through fN for resonant units 150_1 through 150_N is not known in advance but expected to be within a certain range. For example, Josephson junctions can have about a few percent variation in their respective critical currents even when designed the same and manufactured the same. In some cases, the variation in critical current can be from about 2% to about 5% (for a 5 GHz resonator, this corresponds to about a 125 MHz maximum variation).

Although transmission lines 120_1 through 120_N are shown as the channels for directing the radio frequency signal (and likewise receiving responses back from the resonant units 150_1 through 150_N), the channel can be a three-dimensional microwave cavity as understood by one skilled in the art. Also, each transmission line 120 can be representative of two transmission lines when readout is in transmission.

While considering resonant unit 150_1 for explanation purposes, it should be appreciated that the following discussion applies by analogy for each of the resonant units 150_2 through 150_N. If the frequency of radio frequency signal (i.e., the challenge) equals the resonant frequency of resonant unit 150_1, this will be evident in the phase or amplitude of the radio frequency energy reflected or transmitted from resonant unit 150_1 through the transmission line 120 (or transmission line 120_1). For example, assuming that the resonant unit 150_1 has a resonant frequency f1, the response/return radio frequency energy/signal will have a peak in amplitude at frequency f1 and a 180 degree phase shift centered at frequency f1. To read the full identification (fingerprint) of the resonant unit array 104, the probe signal 132 must sweep the frequency of the radio frequency signal over the range of resonant frequencies that can be present in all the resonant units 150_1 through 150_N (for example, from 3 gigahertz (GHz) to 10 GHz) and the probe signal must direct the swept radio frequency signal at all of the resonant units 150_1 through 150_N. Accordingly, all the resonant units 150_1 through 150_N will return radio frequency energy/signals having a peak in amplitude at their respective resonant frequencies f1 through fN and a 180 degree phase shift centered at respective resonant frequencies f1 through fN. The fingerprint consists of the full pattern of spectral lines in frequency space which has been received as the response from the resonant units 150_1 through 150_N. Although peaks in the frequency spectrum are utilized for explanation purposes, it should be noted that the measurement is not limited to measuring peaks. In some implementations, each of the peaks can be a dip depending on the measurement and other system parameters, such that identification is based on measuring dips.

As the response to the previously transmitted radio frequency signal to the resonant units 150_1 through 150_N, the measurement equipment 106 can receive a sequence of the resonant frequencies f1 through fN as the secure identification of the chip 102. The sequence of the resonant frequencies f1 through fN can be stored in the memory 112 and/or be stored separately. After receiving the response (returned signals) from resonant units 150_1 through 150_N of the resonant unit array 104, the measurement equipment 106 is configured to perform a spectral analysis to determine/identify the spectrum of frequencies (peaks) in frequency space for the response received from the resonant units 150_1 through 150_N. In one implementation, the measurement equipment 106 is configured to identify the resonant frequencies f1 through fN for each of the resonant units 150_1 through 150_N as the peaks at frequencies f1 through fN.

In some embodiments of the present invention, the chip 102 is cryogenically cooled and its resonant frequencies are measured after fabrication to test that the resonant units 150_1 through 150_N are functioning. This spectrum is stored as a reference. The chip 102 is then used in quantum computing operations (i.e., during cooling). When the chip's identification is required, the spectrum is measured and compared to the reference spectrum.

The sequence of the resonant frequencies f1 through fN can be transmitted from the measurement equipment 106 to a computer system 108 via a communication medium 122. The communication medium 122 can be a wired (Ethernet cable, USB cable, optical fiber cable, coaxial cable, and twisted pair cable, etc.) or a wireless network connection. The computer system 108 has one or more processors. Similarly, the measurement equipment 106 can have one or more processors. The computer system 108 is configured to compare the sequence of the resonant frequencies f1 through fN received from the measurement equipment 106 with various chip identification numbers previously stored for similar chips 102 in a chip identification database 110. The computer system 108 is configured to determine whether the received sequence of the resonant frequencies f1 through fN matches a previously stored sequence of the resonant frequencies within a statistical margin. The statistical margin can be a predefined amount taking into account each of the measured resonant frequencies f1 through fN. In one example, the statistical margin can be 1%. This means that a 1% difference between the sequence of the resonant frequencies f1 through fN received from the measurement equipment 106 and the identification number in chip identification database 110 is still recognized as a match. The chip 102 can be representative of numerous chips. The chip identification database 110 can include the chip identification numbers for numerous chips 102. Each chip 102 could be utilized in a network of superconducting quantum computers in order to perform quantum computing as understood by one skilled in the art. The respective chip identification numbers for all chips 102 are read out and stored in advance in the chip identification database 110. Each chip 102 could have been read out and stored by the manufacturer of the chips 102. Also, each chip 102 could have been read out and stored by the operator (end user) of the chips 102 who has deployed the chips in the network of superconducting quantum computers.

Figure 3:
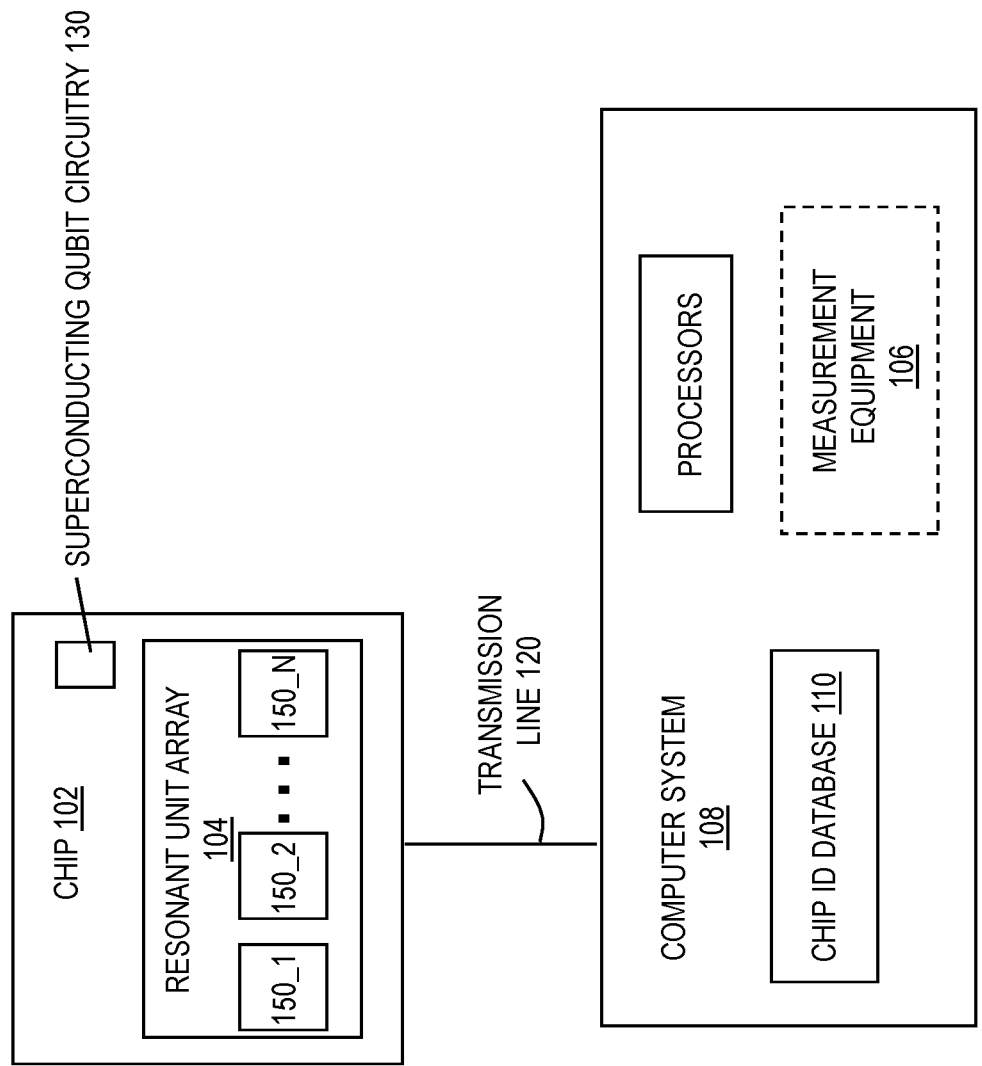
FIG. 3 depicts a schematic of an identification system where resonant units are addressed collectively according to embodiments of the present invention.
Figure 4:
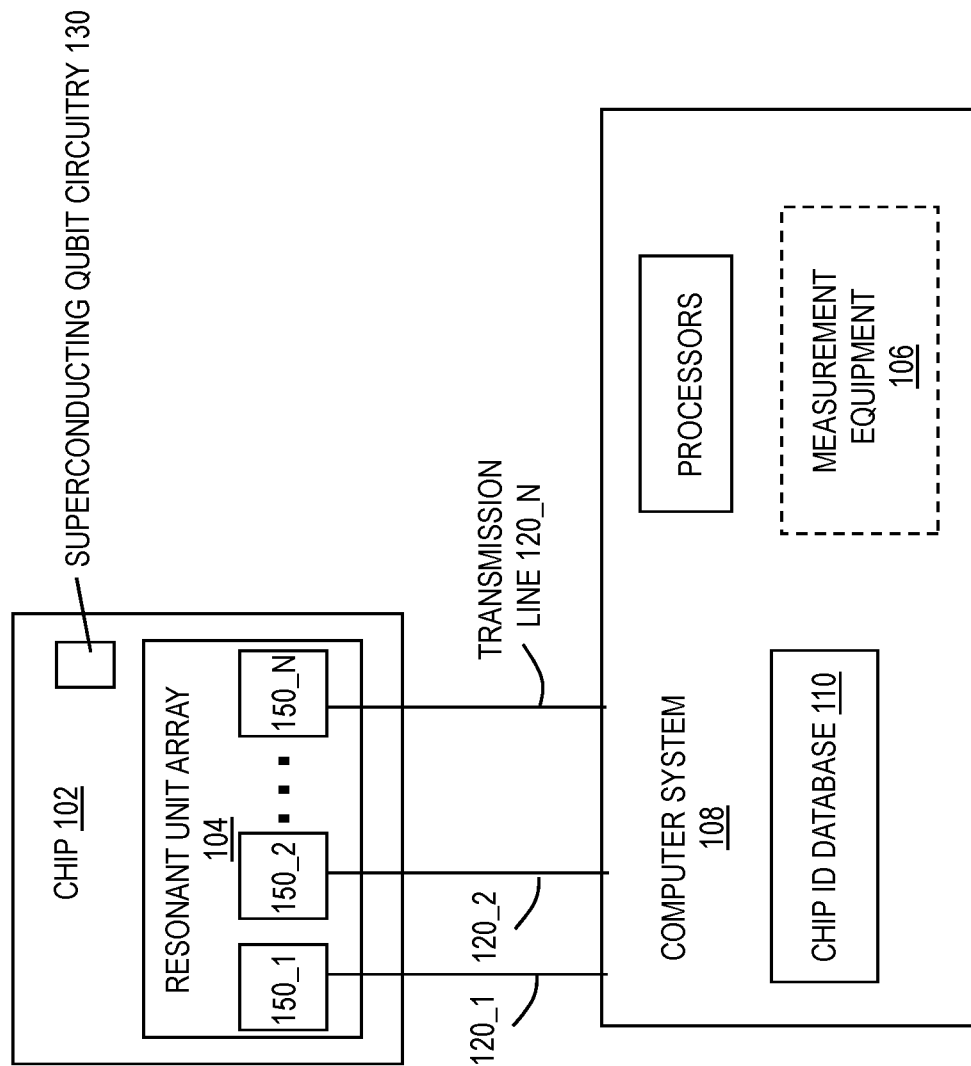
FIG. 4 depicts a schematic of the identification system where resonant units are individually addressed according to embodiments of the present invention.

In some embodiments, the computer system 108 can be integrated with the measurement device 106 as illustrated in FIGS. 3 and 4. FIG. 3 depicts a schematic of an identification system 100 where the resonant units 150_1 through 150_N of the resonant unit array 104 are addressed collectively through the transmission line 120 according to embodiments of the present invention. In other words, the radio frequency signal (challenge) can be sent from the measurement equipment 106 over the same transmission line(s) to all of the resonant units 150_1 through 150_N and the responses are received back over the same transmission line(s). FIG. 4 depicts a schematic of the identification system 100 where the resonant units 150_1 through 150_N of the resonant unit array 104 are individually addressed through the transmission lines 120_1 through 120_N according to embodiments of the present invention. In FIGS. 3 and 4, the measurement equipment 106 does not have to transmit the received sequence of the resonant frequencies f1 through fN to the computer system 108. Instead, the computer system 108 having the functionality of the measurement equipment (or vice versa) can immediately compare the received sequence of the resonant frequencies f1 through fN to the chip identification numbers stored in the chip identification database 110 and then identify the chip 102 as chip XYZ.

Now turning to more detail regarding the resonant units 150_1 through 150_N, each resonant unit has its own Josephson junction. The resonant units 150_1 through 150_N are similar to typical superconducting qubits but have less stringent requirements. A typical superconducting qubit has to be manufactured such that it has long coherence times T1 and T2 and such that the qubit can be read out to obtain its state information. In typical superconducting qubits, the qubit state can be high |1>, low |0>, or a superposition of both high and low. Additionally, typical superconducting qubits utilized for quantum computing (such as superconducting qubit circuitry 130) cannot be read out directly. Instead, a readout resonator is required to be read out such that the quantum information (i.e., state) of the typical superconducting qubits can be inferred based on the microwave signal received back from reading out the readout resonator. Typical superconducting qubits need coupling capacitors to separate each typical superconducting qubit from its readout resonator. Also, typical superconducting qubits need coupling capacitors to separate the typical superconducting qubits from one another. However, resonant units 150_1 through 150_N do not need to maintain state information and therefore are not limited by requirements to maintain long times T1 and T2. Also, the resonant units 150_1 through 150_N can be read out directly by causing the resonant units 150_1 through 150_N to each resonate at their respective resonant frequencies f1 through fN. Additionally, resonant units 150_1 through 150_N do not need to be separated from one another or separated from readout resonators by coupling capacitors. Consequently, resonant units 150_1 through 150_N can be packed tightly together without an issue of losing state information because state information is not needed and without an issue of interference among each other.

Similar to typical superconducting qubits, the resonant units 150_1 through 150_N utilize Josephson junctions. A Josephson junction is formed by two superconductors coupled by, for example, a thin insulating barrier. A Josephson junction can be fabricated by means of an insulating tunnel barrier, such as $Al_2O_3$, between superconducting electrodes. For such Josephson junctions, the maximum supercurrent that can flow through the barrier is the critical current $I_c$. The fabrication of Josephson junctions includes an uncontrollable and unpredictable variation in the tunnel barrier, causing any two or more identically-fabricated Josephson junctions to have non-identical critical currents. Accordingly, the Josephson inductance of these Josephson junctions is different even though the Josephson junctions have the same design and are manufactured the same. This variance (i.e., difference) in Josephson inductance is employed to provide the unique sequence of resonant frequencies f1 through fN (of resonant units 150_1 through 150_N) for the chip 102, such that any other identically designed and manufactured chip will not have the exact same unique sequence of resonant frequencies f1 through fN as chip 102.

FIGS. 5A, 5B, 5C, 5D, 5E, 5F, and 5G depict various resonant unit schematic configurations according to embodiments of the present invention. The resonant units 150_1 through 150_N can be implemented as any of the examples in FIGS. 5A-5G. In FIGS. 5A-5G, each example resonant unit 150 includes a Josephson junction (JJ), an inductor L, and a capacitor C. The inductor L and capacitor C can include circuit components designed to exhibit a particular amount of inductance and capacitance, respectively, or can otherwise have the amount of inductance and capacitance present within the metal patterns and wiring of the circuit, for instance for the case of on-chip transmission lines, as understood by those skilled in the art. Along with the Josephson junction, a resonant unit 150 can be formed by combining capacitors and other inductors on the chip 102. The line-width of the resonance is determined by its coupling to the feed-line or other readout circuitry, and must be made small enough to clearly distinguish each resonance in the frequency domain.

The Josephson junction acts as an inductor and therefore contributes to the total inductance. Frequency addressability (i.e., the different frequencies for resonant units 150_1 through 150_N) can be enforced by changing the amount of inductance and/or changing the amount of capacitance from one resonant unit 150 to another. For example, more or less series inductance and/or parallel inductance can be adjusted (i.e., increased or decreased) from one resonant unit 150 to the next. Additionally, more or less series and/or parallel capacitance can be adjusted from one resonant unit 150 to the next. Larger or smaller Josephson inductance can be adjusted (i.e., increased or decreased) in each resonant unit 150. The resonant frequency of each resonant unit 150 suffers from intrinsic process variability and can be different for two identical chips 102 with a very high probability. As noted herein, this variability from resonant units 150_1 through 150_N is because of the literal imperfections in Josephson junctions, thereby making each chip 102 unique. Even if the inductance of the inductor L and the capacitance of the capacitor C remain the same and the configuration (such as any configuration in FIGS. 5A-5G) is the same for each resonant unit 150_1 through 150_N, the Josephson junctions will still have a varied structure even when designed and fabricated to be the same. The varied structure is in the fabrication of the tunnel barrier of the Josephson junctions, thereby providing the unique secure identification number.

Figure 5D:
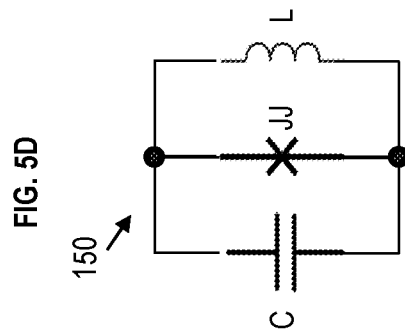
FIG. 5D depicts a schematic of a resonant unit configuration according to embodiments of the present invention.
Figure 5C:
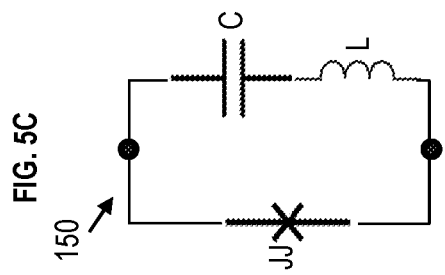
FIG. 5C depicts a schematic of a resonant unit configuration according to embodiments of the present invention.
Figure 5B:
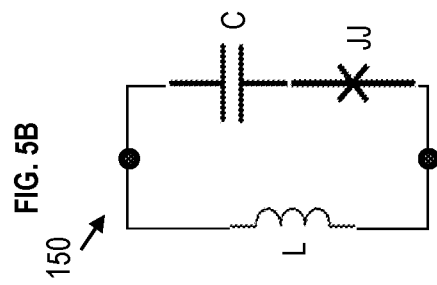
FIG. 5B depicts a schematic of a resonant unit configuration according to embodiments of the present invention.
Figure 5A:
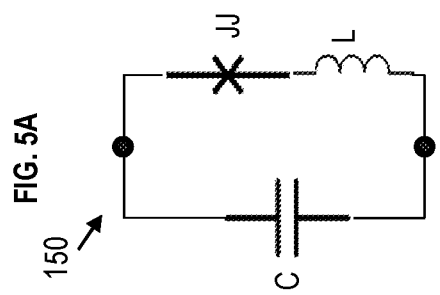
FIG. 5A depicts a schematic of a resonant unit configuration according to embodiments of the present invention.
Figure 5H:
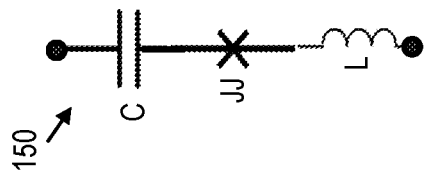
FIG. 5H depicts a schematic of a resonant unit configuration according to embodiments of the present invention.
Figure 5G:
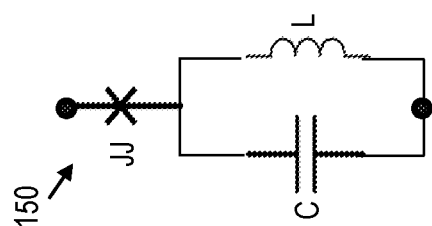
FIG. 5G depicts a schematic of a resonant unit configuration according to embodiments of the present invention.
Figure 5F:
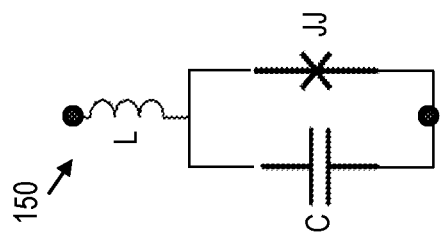
FIG. 5F depicts a schematic of a resonant unit configuration according to embodiments of the present invention.
Figure 5E:
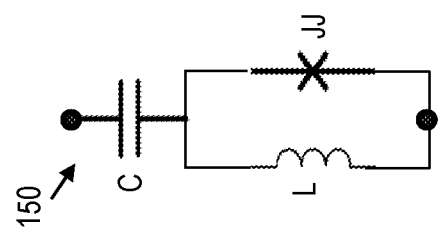
FIG. 5E depicts a schematic of a resonant unit configuration according to embodiments of the present invention.
Figure 6:
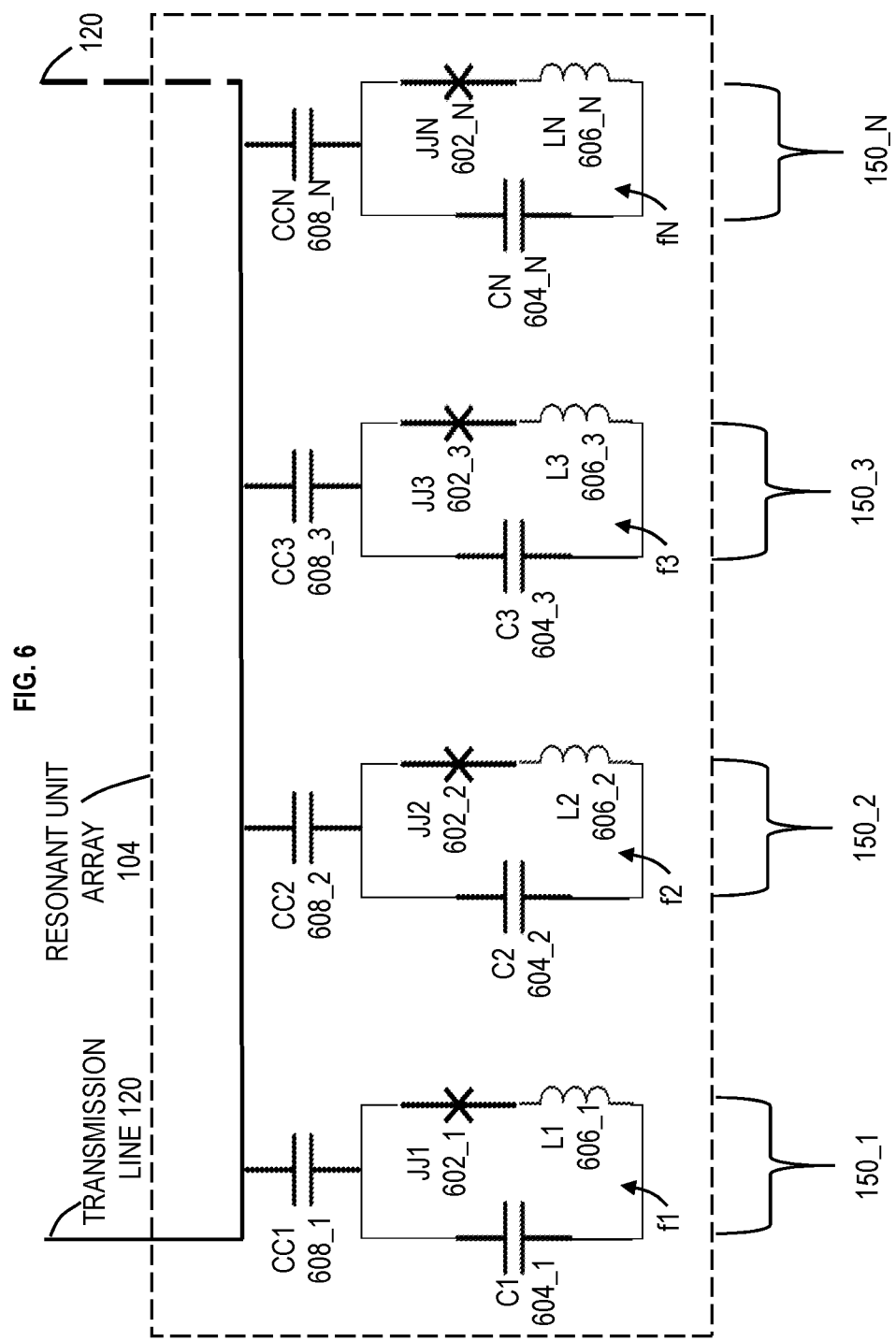
FIG. 6 depicts an example resonant unit array according to embodiments of the present invention.

Taking the configuration of FIG. 5A as an example, FIGS. 6 and 7 illustrate example resonant unit arrays 104 according to embodiments of the present invention. FIG. 6 depicts a schematic of a resonant unit array 104 in which the resonant unit 150_1 through 150_N are collectively addressed. In FIG. 6, the radio frequency signal is input to one transmission line 120 of the resonant unit array 104. The resonant unit array 104 can have only one transmission line 120 if operating in reflection. The resonant unit array 104 can have a second transmission line 120 if operating in transmission, which is shown with dashed lines. The dashed lines transmits the response back to the measurement equipment 106.

FIG. 7 depicts a schematic of a resonant unit array 104 in which the resonant unit 150_1 through 150_N are individually addressed. In FIG. 7, the radio frequency signal is input to each of transmission lines 120_1 through 120_N of the resonant unit array 104. The resonant unit array 104 might have only one set of transmission lines 120_1 through 120_N if operating in reflection. The resonant unit array 104 can have a second set of transmission lines 120_1 through 102_N if operating in transmission, which is shown with dashed lines. The dashed lines transmits the response back to the measurement equipment 106.

FIGS. 6 and 7 show that the resonant units 150_1 through 150_N include Josephson junctions 602_1 through 602_N, capacitors (C) 604_1 through 604_N, and inductors (L) 606_1 through 606_N. In FIGS. 6 and 7, the choice of resonant unit configuration is just an example, but each must contain at least one Josephson junction. The choice of resonant unit 150 (and number of resonant units 150) is just an example. In FIG. 6, transmission line 120 can be capacitively coupled to resonant units 150_1 through 150_N by coupling capacitors (CC) 608_1 through 608_N. In some implementations, coupling inductors can be used in place of coupling capacitors. In other implementations, the coupling capacitors (CC) 608_1 through 608_N can be omitted. In FIGS. 6 and 7, the capacitances of the capacitors 604_1 through 604_N are the same in this example, such that C1=C2=C3 . . . =CN, and the inductances of the inductors 606_1 through 606_N are not the same, such that L1>L2> L3 . . . >LN, thereby resulting in resonant frequencies f1, f2, f3, . . . fN, where f1<f2<f3 . . . , fN. Josephson junctions are nominally identical but have an intrinsic process variation (unavoidable during fabrication) which causes each resonant frequency to be slightly different from chip 102 to another chip 102, even if the two chips are designed the same and identically fabricated. As noted herein, there are numerous chips 102 with each designed to have its own unique chip identification in accordance with embodiments of the present invention. Therefore, an identification of chip 102 can be recorded as the sequence f1, f2, f3, . . . fN, where f1<f2< f3 . . . , fN. If a large enough number of resonant units 150 is implemented such as, for example, 128 resonant units 150 (i.e., N=128), each chip 102 can be uniquely identified by its sequence even if some of the resonances will fluctuate (by, for example, several MHz) between repeated measurements and/or fluctuate over time, as long as the separation between resonances (i.e., the separation between frequencies such as f1 to f2) is larger than the typical window of variation for individual ones. In an exemplary embodiment of the present invention, the separation between resonances (i.e., the separation between f1, f2, f3, . . . fN) can be about 100 MHz while the typical fluctuation of a resonator that is kept cryogenically cooled continuously is less than about 50 kHz; the typical fluctuation of a resonator that is cryogenically cooled at two different times is less than about 5 MHz. This sequence (as the identification of chip 102) is never programmed into the chip 102 because the chip 102 is a PUF configuration. This method makes counterfeiting this type of chip 102 harder because it is nearly impossible (or requires a lot of resources) to copy the sequence exactly using the same Josephson junction layout. Although the Josephson inductance can be replaced with a regular inductor at the cost of more real estate, this is easily discoverable upon chip inspection. This is because the Josephson junction has a large amount of inductance compared to its size, and attempting to replace all the Josephson junctions with regular inductors would result in an enormous chip compared to the chip 102. It is noted that frequency has an inverse relationship to inductance. More particularly, the frequency has an inverse square root relationship to inductance.

It should be appreciated that the resonant unit arrays 104 depicted in FIGS. 1-7 are for example. It should be noted that one or more embodiments can include a circuit (i.e., chip 102) and/or system 100 having multiple resonant units 150_1 through 150_N containing Josephson junctions 602_1 through 602_N, where the resonant units 150_1 through 150_N are coupled to a readout mechanism (such as measurement equipment 106) in order to read out a sequence of analog resonant frequencies signatures, thereby providing a unique random identification of the chip 102. The circuit can be a hanger-style transmission line or a microwave cavity. In some implementations, individually addressed resonant units can be made with individual patterned readouts (as depicted in FIGS. 2, 4, 7). Although having individually addressed resonant units on chip 102 consumes more real estate, this allows though for the Josephson junctions (along with inductors L and capacitors C) to be made identical (i.e., with the same frequency band) to one another in the resonant unit array 104, because Josephson junctions are addressed by their respective location in their individual resonant units 150_1 through 150_N.

In other implementations, in the resonant unit array 104, the Josephson junctions (in respective resonant units 150_1 through 150_N) can be made slightly different from one resonant unit 150 to the next. For example, the Josephson junctions 602_1 through 602_N (in respective resonant units 150_1 through 150_N) can be made with different sizes, made with different critical currents $I_c$, made with different capacitive loads (i.e., different values for capacitors C1 604_1 through CN 604_N), and/or made with different inductive loads (i.e., different values for inductors L1 606_1 through LN 606_N) in order to identify each bit by a predictable analog frequency range. That is, one can have f1<f2<f3 . . . fN or vice versa. Each bit is a resonant frequency of the resonant units 150_1 through 150_N, such that the measured resonant frequency f1 is the bit for resonant unit 150_1, measured resonant frequency f2 is the bit for resonant unit 150_2, through measured resonant frequency fN is the bit for resonant unit 150_N. The chip 102 can represent numerous chips. A chip 102 can have 128 bits thereby having 128 resonant units 150 such that there are 128 resonant frequencies that are measured out. In one implementation, the resonant unit array 104 would utilize less space on the chip 102 when the 128 resonant units 150 are addressed and measured collectively because one transmission line 120 is needed for readout in reflection or two transmission lines 120 needed for readout in transmission. Having so many resonant units 150 (e.g., 128 bits, 64 bits, 32 bits, etc.) packed tightly is no problem for chip 102 because coherence is not a concern for operation as noted above.

Security against counterfeiting is implemented through random process variability (in the fabrication of Josephson junctions) to identify a chip (instead of programming), which makes the chip 102 fall within the concept of physically unclonable function. Physically unclonable function requires enough bits in order to correct for fluctuations, and using 32 bits (i.e., 32 resonant units 150), 64 bits, 128 bits, etc. provides bits to correct for fluctuations in the readout of the sequence of resonant frequencies f1 through fN of the resonant units 150_1 through 150_N. Each bit, after taking into account the readout method (reflection versus transmission, use of a three-dimensional microwave cavity, etc.) and added load, has an analog frequency which is distinct, with a given confidence, from that of the same bit on another chip 102. That is, there can be two (or more) chips 102 having the same number of the resonant units 150_1 through 150_N and fabricated in the same way with the same values/size for the Josephson junctions 602_1 through 602_N, same values for capacitors C1 604_1 through CN 604_N, and same values for inductors L1 606_1 through LN 606_N. Although these two (or more) chips 102 are designed to be the same, there will be differences (i.e., variability) in the Josephson junctions 602_1 through 602_N of the resonant units 150_1 through 150_N between one chip 102 to the next chip 102. This variability accounts for the uniqueness of the sequence of analog frequencies on each chip 102 that forms its identification. The uniqueness of such an identification depends on statistical pattern recognition in which the chip 102 will be recognized as long as the pattern is unique even after accounting for fluctuations of each frequency (i.e., each resonant frequencies f1 through fN) over time or after repeated readouts.

To illustrate fluctuations in reading the chip 102 over time or after repeated readouts, FIG. 8 depicts an example of authentication of the chip 102 according to embodiments of the present invention. FIG. 8 only shows a simplified view of the system 100 so as not to obscure the figure. It should be appreciated that FIG. 8 includes all elements discussed in FIGS. 1-7. In FIG. 8, it is assumed that the secure identification of the chip 102 has been read out. Once identification is read out, the measured identification can be checked against the chip identification database 110. Given the number of resonant units 150, process variability (standard deviation of frequency) and fluctuations between runs (repeatability), the certainty of the chip assignment will depend on the probability of collisions (bits with identical frequencies) between chip identifications of this kind. A few example scenarios are provided below. In the first scenario, depending on the repeatability of sequential readouts of the identification of the same chip 102, some bits can have their analog frequencies fluctuate by more than 0.1% occasionally, which in some implementations is 5 MHz. In these implementations, if the number of bits is 128, authentication can be 99.9% accurate (accurate for 999 out of 1,000 chips manufactured) as long as an authentication threshold of no less than any 95% of the bits, or 122 bits (out of 128 total), match an existing identification stored in database 110. The accuracy of 99.9% is provided as an example and depends on the actual physical properties of the system, such as process variability and fluctuations between runs. In a second scenario, if process variability results in a larger standard deviation of the frequency, for example increasing from 50 MHz to 75 MHz, then the probability of overlap between the frequencies of two distinct bits that are designed to be 100 MHz apart will increase. In this scenario, there can be at least two distinct chips 102 with no less than a 95% pattern match to the same stored identification in database 110, and the net accuracy of authentication will drop from 99.9% to, for example, 90%. In this same second scenario, 99.9% accuracy can only be recovered as long as an authentication threshold of no less than 97% of the bits, or 124 bits, match an existing identification stored in database 110, and the two distinct chips 102 will result in distinct matching identifications.

In the case where a chip 102 is (incorrectly) authenticated as a distinct chip 102 in the database 110, this is called a false positive authentication. In yet a third scenario, if the fluctuation between runs of the frequency of each bit increases from 0.1% to 1%, or from 5 MHz to 50 MHz in some implementations, then the probability of matching the frequency of each read out bit to the one stored in database 110 decreases. In this third scenario, there can be a chip 102 previously enrolled into the database 110 that upon repeated readouts displays less than a 95% pattern match to any identification stored in database 110, and the net accuracy of authentication will drop from 99.9% to, for example, 95%. In this same third scenario, 99.9% accuracy can only be recovered as long as the authentication threshold is lowered, and as a consequence, no less than 93% of the bits, or 119 bits (out of the 128 total), might be needed to match an existing identification stored in database 110; this chip 102 will then result in a match to an existing identification in database 110. In the case where a chip 102 is not authenticated, even though the chip has been previously enrolled in database 110, this is called a false negative authentication.

It should be appreciated that a window (as a balance) for accurate authentication exists if the authentication threshold is as low as it needs to be to avoid false negative authentication, and as high as it has to be to avoid false positive authentication. In some implementations, false negative authentication can be avoided with an authentication threshold of 95% and false positive authentication can be avoided with an authentication threshold of 90%, and an intermediate arbitrary authentication threshold of 93% can be chosen to provide an accuracy of 99.9% of authentication (such that 999 out of 1,000 chips are correctly identified). The accuracy can additionally depend on how many chips are manufactured (i.e., 1,000, 10,000) and how many bits are stored (the more bits, the more unique the identification of each chip can be, at the price of taking more space on chip). 128 bits can identify a maximum of 2^128 chips (in excess of 3 followed by 38 zeros in number of chips). Additionally, false negative identification can be reduced by making multiple repeated measurements to improve the probability of measuring each frequency correctly in the case of measurement noise.

Returning to FIG. 8, the identification is recognized as ID1 (or chip XYZ) because the readouts are statistically unique within the confidence margin. The confidence margin can be a 1% difference or a 99% confidence interval. Although the identification readout from chip 102 has the measured sequence identification 4.233 GHz, 4.313 GHz, 4.435 . . . GHz and the computer database 110 has the stored identification ID1 (or XYZ) as 4.234 GHz, 4.312 GHz, 4.437 . . . GHz, the computer system 108 is configured to recognize that the measured sequence identification (4.233 GHz, 4.313 GHz, 4.435 GHz . . . ) and the stored chip identification ID1 (or XYZ) sequence (4.234 GHz, 4.312 GHz, 4.437 . . . GHz) are statistically the same. Even though the underlined digits are different, the computer system 108 is configured to chip 102 as chip with identification ID1 (or chip XYZ) because the readouts are statistically the same.

Figure 12A:
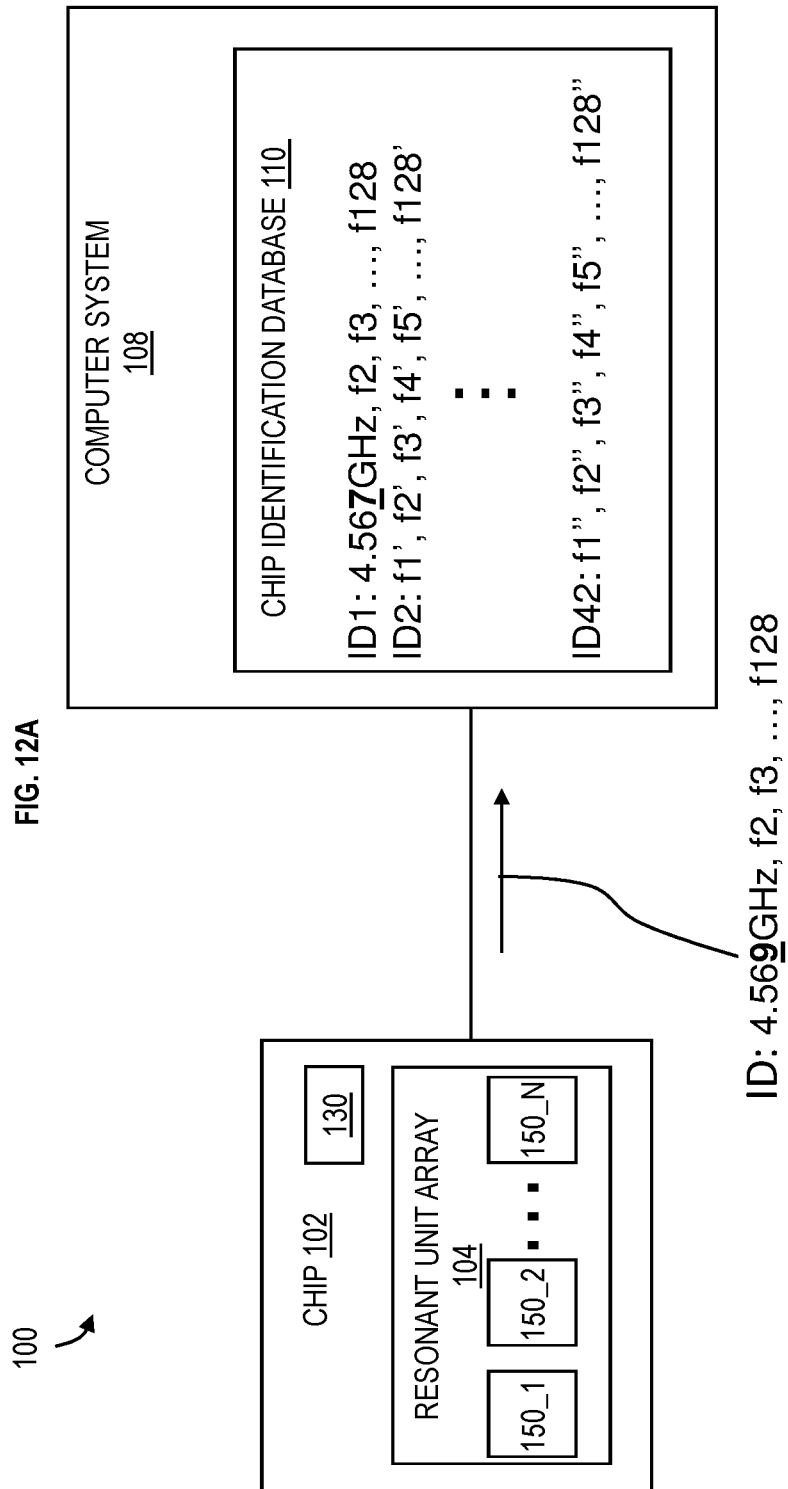
FIG. 12A depicts an example of authentication of a superconducting chip according to embodiments of the present invention.

To further illustrate fluctuations in reading the chip 102 over time or after repeated readouts, FIG. 12A depicts an example of authentication of the chip 102 according to embodiments of the present invention. FIG. 12A only shows a simplified view of the system 100 so as not to obscure the figure. It should be appreciated that FIG. 12A includes all elements discussed in FIGS. 1-7. In FIG. 12A, it is assumed that the secure identification of the chip 102 has been read out. Once identification is read out, the measured identification can be checked against the chip identification database 110. This example represents 128 bits being read out which means there are frequencies f1, f2, . . . f128 in the measured sequence identification. Although there are 128 bits that have been read out, this example focuses on a single bit which is arbitrarily selected as bit 1 (i.e., frequency f1) for explanation purposes. In this case, the frequencies f2-f128 for bits 2-128 of previously stored chip identification ID1 (stored sequence) in the database 110 can match the frequencies f2-f128 of chip 102 that has been read out in the measured sequence. However, frequency f1 for bit 1 of the measured sequence does not match the frequency f1 for bit 1 of the previously stored sequence. For the chip identification ID1 (chip ID1) in the database 110, the frequency f1 stored for bit 1 is 4.567 GHz. However, the read out frequency f1 of same bit 1 is 4.569 GHz. The computer system 108 is configured to confirm recognition of bit 1 (as a match) because of a less than (<) 5 MHz margin (+/−0.1% of frequency in this implementation). After the comparison, the difference between the measured frequency f1=4.569 GHz (bit 1) is within the (predefined) 5 MHz margin of the previously stored frequency f1=4.567 GHz (stored bit 1), and therefore the computer system 108 determines the match between the measured sequence identification (f1=4.569, f2, f3 . . . f128 GHz) of chip 102 and the previously stored sequence identification (f1=4.567, f2, f3 . . . f128 GHz) of chip identification ID1.

Figure 12B:
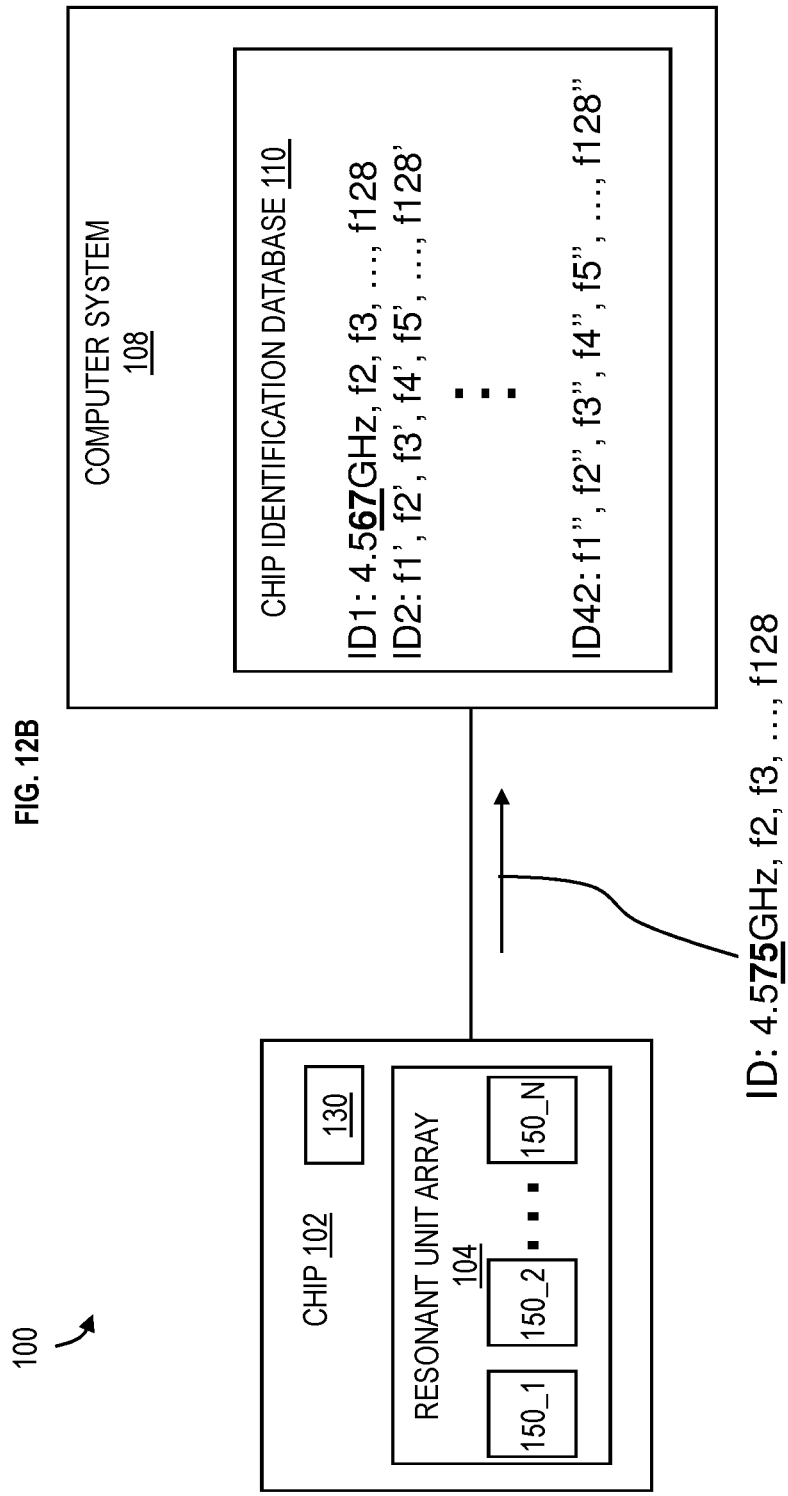
FIG. 12B depicts an example of authentication of a superconducting chip according to embodiments of the present invention.

FIG. 12B depicts an example of authentication of the chip 102 according to embodiments of the present invention. The scenario in FIG. 12B is identical to FIG. 12A except the readout frequency f1 of same bit 1 is 4.575 GHz. The computer system 108 is configured to fail recognition of the readout bit 1 as a match to measured bit 1 because the difference between the measured frequency f1=4.575 GHz (bit 1) and the previously stored frequency f1=4.567 GHz (stored bit 1) is greater than (>) the 5 MHz margin (+/−0.1% of frequency in this implementation). The computer system 108 determines that there is no match between the measured bit 1 and the stored bit 1 for the previously stored chip identification 1.

Further illustrating fluctuations in reading the chip 102 over time or after repeated readouts, FIG. 13A depicts an example of authentication of the chip 102 according to embodiments of the present invention. FIG. 13B depicts an example of authentication of the chip 102 according to embodiments of the present invention. In these examples, the database 110 has frequencies previously stored for bits 1, 2, 3, 4 . . . 128 of chip ID42 as 4.567 GHz, 4.654 GHz, 4.759 GHz, 4.847 GHz, . . . f128.

In FIG. 13A, the read out frequencies of the same bits 1, 2, 3, 4 . . . 128 of chip 102 are measured (via measurement equipment 106) as 4.575 GHz, 4.655 GHz, 4.756 GHz, 4.850 GHz, . . . f128. The computer system 108 is configured to authenticate this chip 102 as chip identification 42 in the database because all but bit 1 satisfies the <5 MHz margin (+/−0.1%) and the authentication threshold is set at 125 bits.

In FIG. 13B, the read out frequencies of the same bits 1, 2, 3, 4 . . . 128 of chip 102 are measured (via measurement equipment 106) as 4.575 GHz, 4.665 GHz, 4.745 GHz, 4.835 GHz, . . . f128. The computer system 108 is configured to not authenticate this chip 102 as chip identification ID42 because 4 bits do not satisfy the <5 MHz margin (+1-0.1%) and the authentication threshold is set at 125 bits (but only 124 bits are recognized). This chip 102 can yet be authenticated as a different chip after all chip IDs are searched within the database 110.

As a consideration in FIG. 13B, this can be an example of a false negative by saying that chip with ID42 did not get authenticated because it had been previously enrolled but its bits 1-4 fluctuated too far from the stored values, and it would have been authenticated correctly if the authentication threshold had been set lower to 124 bits. In one implementation, the threshold can be set to 124 bits, such that the measured chip 102 is correctly identified as chip identification ID42.

As further consideration, an example of a false positive is as follows. A chip with stored ID99 has 124 bits in common with stored ID42 with the exception of bits 1-4, where bit 1 of ID99 is close but more than 5 MHz away from bit 1 of ID42. Due to fluctuation in the value of the readout frequency of bit 1 of ID99, its frequency becomes close to bit 1 of ID42 within <5 MHz (+/−1%). Chip with ID99 will then have 125 bits in common with the ID stored for chip with ID42 and pass the authentication threshold. Chip with ID99 could then be authenticated erroneously as ID42, and it would have been authenticated correctly had the authentication threshold been set higher to 126 bits. In such a case, the authentication threshold would be set higher to 126 bits by the computer system 108 (with respect to chip ID42 and chip ID99).

FIG. 9 depicts a flow chart 900 of a method of forming a chip according to embodiments of the present invention. At block 902, resonant units 150_1 through 150_N are formed each including a Josephson junction 602, and the resonant units have resonant frequencies f1 through fN whose differences are based on a variation in the Josephson junction 602. At block 904, a transmission medium (e.g., transmission line 120 and/or microwave cavity) is coupled to the resonant units 150_1 through 150_N, and the transmission medium is configured to output a sequence of the resonant frequencies f1 through fN as an identification of the chip 102.

Each one of the resonant units 150_1 through 150_N has an individual resonant frequency (e.g., resonant unit 150_1 has resonant frequency f1) of the resonant frequencies. The variation in the Josephson junction 602 is the result of uncontrollable fabrication randomness, including but not limited to, lithographic line edge roughness, area uniformity, thickness uniformity of the tunnel barrier, grain size of the superconducting metal, thickness uniformity of the superconducting metal, and/or random change in the Josephson junction. Each one of the resonant units 150_1 through 150_N is configured to be uniquely identified by an individual resonant frequency (e.g., resonant unit 150_2 is identified by its resonant frequency f2) of the resonant frequencies. The resonant units 150_1 through 150_N are superconducting qubits.

The resonant units 150_1 though 150_N are configured to be read out (via measurement equipment 106) by receiving a radio frequency signal. The readout using the radio frequency is configured to output the sequence of the resonant frequencies f1 through fN as the identification of the chip 102. The transmission medium is selected from one or more transmission lines 120 and a microwave cavity (e.g., a three-dimensional microwave cavity).

The resonant units 150_1 through 150_N include capacitive elements (e.g., capacitors C 604) and inductive elements (e.g., inductors L 606). The resonant units 150_1 through 150_N can be designed differently to order the resonant frequencies. For example, resonant units 150_1 through 150_N can be designed where f1 of resonant unit 150_1 is lower than f2 of resonant unit 150_2, where f2 of resonant unit 150_2 is lower than f3 of resonant unit 150_3, where f3 of resonant unit 150_3 is lower than f4 of resonant unit 150_4, and so forth.

The Josephson junction 602 in each of the resonant units 150_1 through 150_N is designed identically and the sequence of the resonant frequencies constitute a physically unclonable function (PUF).

FIG. 10 depicts a flow chart 1000 of a method of identifying a chip 102 according to embodiments of the present invention. At block 1002, the computer system 108 (and/or measurement equipment 106) is configured to receive a sequence of resonant frequencies as an identification of the chip 102, and a difference in the resonant frequencies is based on a variation in Josephson junctions 602 on the chip 102. At block 1004, the computer system 108 (and/or measurement equipment 106) is configured to identify the sequence of the resonant frequencies f1 through fN output from the chip 102 as a match within a predefined margin to a stored identification (in the chip identification database 110) of the chip 102.

FIG. 11 depicts a flow chart 1100 of a method of causing identification of a chip 102 according to embodiments of the present invention. At block 1102, the computer system 108 (and/or measurement equipment 106) is configured to cause the chip 102 to provide a sequence of resonant frequencies from its resonant units 150_1 through 150_N, and a difference in the resonant frequencies is based on a variation in a dispersive nonlinear element in the resonant units. The computer system 108 can cause the measurement equipment 106 to read out the sequence of resonant frequencies from chip 102 along with any other superconducting chips in the network. A Josephson junction is a dispersive nonlinear element.

At block 1104, the computer system 108 is configured to determine that a previously stored sequence (in the chip identification database 110) is a match within a predefined margin to the sequence of the resonant frequencies just measured from chip 102. The computer system 108 is configured to compare the sequence of the resonant frequencies just measured from chip 102 to all previously stored sequences/identifications, and there could be hundreds or thousands of other chips 102 with their own (different) sequences of resonant frequencies in the database 110 (and in the network connected to chip 102).

At block 1106, the computer system 108 is configured to, in response to the match within a predefined margin, identify the chip 102 having the sequence of the resonant frequencies f1 through fN from different chips 102 (e.g., in the database 110) having different sequences of resonant frequencies.

In response to the match, the measurement equipment 106 (and/or the computer system 108) is configured to authenticate the chip 102 having the present identification from different chips (in the database 110) having different identifications.

There are many scenarios of how the superconducting chips 120 can be utilized, and authentication of a particular chip 102 among other chips 102 can include various processes. First, after chip manufacturing, and often performed at the manufacturer's site, the chip identification is read out (by an operator or automated process) at cryogenic temperatures and stored in the chip identification database 110. This process is typically known as enrollment. After the chip 102 is deployed in the field at a user facility, the chip identification can be read out and communicated back to the manufacturer. Then, the manufacturer performs a search in its chip identification database 110 for the communicated chip identification and performs a statistical match between this identification and the existing enrolled ones to provide authentication. When requesting authentication, the user could be trying to ascertain if the chip 102 is authentic and not a counterfeit by verifying its existence in the manufacturer's chip identification database 110. When requesting authentication, the user could be trying to initiate secure communication with a third party's server with mediation by the manufacturer, who can authenticate the user's chip identification as trustworthy and grant it permission to access the third party's server upon searching for the chip identification in its chip identification database 110 and authenticating it. When requesting authentication, the user could be deciding how to distribute workloads across the network of existing chips 102 and finding available quantum processors. It should be appreciated that there are many ways to take advantage of superconducting qubit chips 102 with secure authentication.

The circuit elements of the circuits 102, 104, 130 can be made of superconducting material. The respective resonators and transmission/feed/probe signal lines are made of superconducting materials. Examples of superconducting materials (at low temperatures, such as about 10-100 millikelvin (mK), or about 4 K) include niobium, aluminum, tantalum, etc. For example, the Josephson junctions are made of superconducting material, and their tunnel junctions can be made of a thin tunnel barrier, such as an oxide, or a weak link, separating two superconducting electrodes. The capacitors can be made of superconducting material separated by a gap or a dielectric material. The transmission lines (i.e., wires) connecting the various elements are made of a superconducting material.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Films of both conductors (e.g., poly-silicon, aluminum, copper, etc.) and insulators (e.g., various forms of silicon dioxide, silicon nitride, etc.) are used to connect and isolate transistors and their components. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device. On-chip superconducting circuits described here are created by adapting the techniques of semiconductor fabrication to the formation of needed patterns in superconducting metal films on a semiconductor substrate.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of forming a superconducting chip comprising:

forming superconducting qubits each including a Josephson junction, the superconducting qubits having resonant frequencies whose differences are based on a variation in the Josephson junction in each of the superconducting qubits, the variation in the Josephson junction in each of the superconducting qubits causing a difference in inductance for the superconducting qubits; and providing a transmission medium coupled to each of superconducting qubits without requiring a readout resonator for reading out the Josephson junctions, the transmission medium being configured to directly output, an individual resonant frequency from each of the superconducting qubits having the Josephson junction as, a sequence of the resonant frequencies in direct relation to the variation in the Josephson junction in each of the superconducting qubits, the sequence being an identification of the superconducting chip without requiring the readout resonator, values of the resonant frequencies in the sequence each being output in direct relation to the Josephson junction in each of the superconducting qubits, wherein the sequence of the resonant frequencies output from the superconducting chip is identified as a match within a predefined margin to a stored identification in relation to the variation in the Josephson junctions of the superconducting chip.

2. The method of claim 1, wherein each one of the superconducting qubits is represented in the resonant frequencies of the sequence.

3. The method of claim 1, wherein the variation in the Josephson junctions is a result of uncontrollable fabrication randomness in the Josephson junctions.

4. The method of claim 1, wherein each one of the superconducting qubits is configured to be uniquely identified by the individual resonant frequency of the resonant frequencies.

5. The method of claim 1, wherein the superconducting qubits are configured to be read out by receiving a radio frequency signal.

6. The method of claim 5, wherein readout using the radio frequency signal is configured to output the sequence of the resonant frequencies as the identification of the superconducting chip.

7. The method of claim 1, wherein the transmission medium is selected from one or more transmission lines and a microwave cavity.

8. The method of claim 1, wherein the superconducting qubits include capacitive elements and inductive elements.

9. The method of claim 1, wherein the superconducting qubits are designed differently to order the resonant frequencies.

10. The method of claim 1, wherein the Josephson junction in each of the superconducting qubits is designed identically and the sequence of the resonant frequencies constitute a physically unclonable function.

11. A method of identifying a superconducting chip having superconducting qubits, the method comprising:
receiving a sequence of resonant frequencies directly output, as an individual resonant frequency from each of the superconducting qubits having a Josephson junction, via a transmission medium coupled to each of the superconducting qubits as an identification of the superconducting chip, a difference in the resonant frequencies being based on a variation in Josephson junctions of the superconducting qubits on the superconducting chip, the sequence of the resonant frequencies being received without requiring a readout resonator for reading out the Josephson junctions, the variation in the Josephson junction in each of the superconducting qubits causing a difference in inductance for the superconducting qubits, values of the resonant frequencies in the sequence each being output in direct relation to the Josephson junction in each of the superconducting qubits; and
identifying the sequence of the resonant frequencies output from the superconducting chip as a match within a predefined margin to a stored identification in relation to the variation in the Josephson junctions of the superconducting chip.

12. A method of causing identification of a superconducting chip having superconducting qubits, the method comprising:
causing the superconducting chip to directly output, an individual resonant frequency from each of the superconducting qubits having a Josephson junction, via a transmission medium coupled to each of the superconducting qubits a sequence of resonant frequencies from the superconducting qubits, a difference in the resonant frequencies being based on a variation in the Josephson junction in each of the superconducting qubits, the sequence of the resonant frequencies being received without requiring a readout resonator for reading out the Josephson junctions, the variation in the Josephson junction in each of the superconducting qubits causing a difference in inductance for the superconducting qubits, values of the resonant frequencies in the sequence each being output in direct relation to the Josephson junction in each of the superconducting qubits;
determining that a previously stored sequence in direct relation to the variation in the Josephson junctions is a match within a predefined margin to the sequence of the resonant frequencies in relation to the variation in the Josephson junctions; and
in response to the match within the predefined margin, identifying the superconducting chip having the sequence of the resonant frequencies from different superconducting qubits having different sequences of other resonant frequencies.

13. The method of claim 12, wherein the predefined margin is less than about 5 MHz.

14. The method of claim 12, wherein the predefined margin is about 0.1%.

15. The method of claim 12, wherein the predefined margin is about 1%.

16. The method of claim 1, wherein the superconducting chip comprises superconducting circuitry, the superconducting circuitry comprising one or more other superconducting qubits configured to be read out by one or more readout resonators, the one or more other superconducting qubits being different from the superconducting qubits.

* * * * *